US008608545B2

(12) United States Patent
Arora et al.

(10) Patent No.: US 8,608,545 B2
(45) Date of Patent: Dec. 17, 2013

(54) GAMING SYSTEM, GAMING DEVICE, AND METHOD PROVIDING A GAME INCLUDING A CASCADING SYMBOLS FEATURE CAUSING ONE OR MORE REPOSITIONED SYMBOLS TO BE WILD SYMBOLS

(75) Inventors: Prashant Arora, Mountain View, CA (US); Scott A. Caputo, Santa Clara, CA (US); Alan Robert Weiss, Petaluma, CA (US)

(73) Assignee: IGT, Las Vegas, NV (US)

( * ) Notice: Subject to any disclaimer, the term of this patent is extended or adjusted under 35 U.S.C. 154(b) by 194 days.

(21) Appl. No.: 13/312,651

(22) Filed: Dec. 6, 2011

(65) Prior Publication Data

US 2013/0143635 A1    Jun. 6, 2013

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.
USPC .............................................. 463/20; 463/22

(58) Field of Classification Search
USPC ..................................................... 463/20, 23
See application file for complete search history.

(56) References Cited

U.S. PATENT DOCUMENTS

| | | | |
|---|---|---|---|
| 1,564,746 | A | 12/1925 | Barnard |
| 1,978,395 | A | 10/1934 | Groetchen |
| 3,420,525 | A | 1/1969 | Waders |
| 3,642,287 | A | 2/1972 | Lally et al. |
| 3,735,987 | A | 5/1973 | Ohki |
| 3,977,681 | A | 8/1976 | Deitrich |
| 4,099,722 | A | 7/1978 | Rodesch et al. |
| 4,114,890 | A | 9/1978 | Yamamoto et al. |
| 4,171,814 | A | 10/1979 | Tamano |
| 4,198,052 | A | 4/1980 | Gauselmann |
| 4,200,291 | A | 4/1980 | Hooker |
| 4,326,351 | A | 4/1982 | Heywood et al. |
| 4,357,567 | A | 11/1982 | Rock |
| 4,448,419 | A | 5/1984 | Telnaes |
| 4,573,681 | A | 3/1986 | Okada |
| 4,636,951 | A | 1/1987 | Harlick |
| 4,651,996 | A | 3/1987 | Watkins et al. |
| 4,695,053 | A | 9/1987 | Vazquez, Jr. et al. |
| 4,790,537 | A | 12/1988 | Smyth et al. |
| 4,826,169 | A | 5/1989 | Bessho et al. |

(Continued)

FOREIGN PATENT DOCUMENTS

| | | |
|---|---|---|
| AU | 1997047657 | 6/1998 |
| AU | 199917318 | 9/1999 |

(Continued)

*Primary Examiner* — William M. Brewster
(74) *Attorney, Agent, or Firm* — Neal, Gerber & Eisenberg LLP

(57) ABSTRACT

The present disclosure provides a gaming system, device, and method providing a cascading symbols feature. For a play of a game, the system generates and displays one of a plurality of symbols at each of a plurality of symbol display areas, and determines any awards associated with the displayed symbols. If a triggering event occurs, the system determines a set of the displayed symbols. For each displayed symbol of the determined set, the system removes that displayed symbol, resulting in an empty symbol display area. For each empty symbol display area, the system repositions one of the other displayed symbols, which creates a second empty symbol display area, and causes at least one of any repositioned symbols to be a wild symbol. The system generates and displays one of the symbols at each of any second empty symbol display areas, and determines any additional awards associated with the displayed symbols.

29 Claims, 13 Drawing Sheets

(56) References Cited

U.S. PATENT DOCUMENTS 4,838,552 A 6/1989 Hagiwara
4,874,173 A 10/1989 Kishishita
5,019,973 A 5/1991 Wilcox et al.
5,152,529 A 10/1992 Okada
5,205,555 A 4/1993 Hamano
RE34,244 E 5/1993 Hagiwara
5,308,065 A 5/1994 Bridgeman et al.
5,332,228 A 7/1994 Schultz
5,364,100 A 11/1994 Ludlow et al.
5,393,061 A 2/1995 Manship et al.
5,395,111 A 3/1995 Inoue
5,423,539 A 6/1995 Nagao
5,431,408 A 7/1995 Adams
5,449,173 A 9/1995 Thomas et al.
5,564,700 A 10/1996 Celona
5,580,053 A 12/1996 Crouch
5,584,764 A 12/1996 Inoue
5,609,524 A 3/1997 Inoue
5,611,535 A 3/1997 Tiberio
5,624,119 A 4/1997 Leake
5,664,998 A 9/1997 Seelig et al.
5,704,835 A 1/1998 Dietz
5,720,662 A 2/1998 Holmes et al.
5,722,891 A 3/1998 Inoue
5,752,881 A 5/1998 Inoue
5,766,074 A 6/1998 Cannon et al.
5,769,716 A 6/1998 Saffari et al.
5,772,506 A 6/1998 Marks et al.
5,807,172 A 9/1998 Piechowiak
5,813,911 A 9/1998 Margolin
5,823,873 A 10/1998 Moody
5,833,238 A 11/1998 Watanabe
5,833,536 A 11/1998 Davids et al.
5,833,537 A 11/1998 Barrie
5,863,249 A 1/1999 Inoue
5,882,260 A 3/1999 Marks et al.
5,927,714 A 7/1999 Kaplan
5,935,002 A 8/1999 Falciglia
5,951,397 A 9/1999 Dickinson
5,980,384 A 11/1999 Barrie
5,984,782 A 11/1999 Innoue
5,997,400 A 12/1999 Seelig et al.
5,997,401 A 12/1999 Crawford
6,027,115 A 2/2000 Griswold et al.
6,033,307 A 3/2000 Vancura
6,056,642 A 5/2000 Bennett
6,059,289 A 5/2000 Vancura
6,059,658 A 5/2000 Mangano et al.
6,086,066 A 7/2000 Tekeuchi et al.
6,089,976 A 7/2000 Schneider et al.
6,089,977 A 7/2000 Bennett
6,093,102 A 7/2000 Bennett
6,095,921 A 8/2000 Walker et al.
6,117,013 A 9/2000 Eiba
6,120,031 A 9/2000 Adams
6,120,376 A 9/2000 Bennett
6,120,377 A 9/2000 McGinnis et al.
6,139,124 A 10/2000 Baerlocher et al.
6,142,875 A 11/2000 Kodachi et al.
6,149,521 A 11/2000 Sanduski
6,159,095 A 12/2000 Frohm et al.
6,159,096 A 12/2000 Yoseloff
6,174,235 B1 1/2001 Walker et al.
6,190,254 B1 2/2001 Bennett
6,203,009 B1 3/2001 Sines et al.
6,220,959 B1 4/2001 Holmes, Jr. et al.
6,224,484 B1 5/2001 Okuda et al.
6,227,971 B1 5/2001 Weiss
6,241,607 B1 6/2001 Payne et al.
6,251,013 B1 6/2001 Bennett
6,254,481 B1 7/2001 Jaffe
6,261,178 B1 7/2001 Bennett
6,270,411 B1 8/2001 Gura et al.
6,270,412 B1 8/2001 Crawford et al.
6,290,600 B1 9/2001 Glasson
6,299,165 B1 10/2001 Nagano
6,299,170 B1 10/2001 Yoseloff
6,302,398 B1 10/2001 Vecchio
6,302,429 B1 10/2001 Friedrich
6,305,686 B1 10/2001 Perrie et al.
6,311,976 B1 11/2001 Yoseloff et al.
6,315,660 B1 11/2001 DeMar et al.
6,315,663 B1 11/2001 Sakamoto
6,316,663 B1 11/2001 Sakamoto
6,318,721 B1 11/2001 Randall et al.
6,319,124 B1 11/2001 Baerlocher et al.
6,322,078 B1 11/2001 Adams
6,347,996 B1 2/2002 Gilmore et al.
6,358,144 B1 3/2002 Kaddlic et al.
6,364,766 B1 4/2002 Anderson et al.
6,375,570 B1 4/2002 Poole
6,394,902 B1 5/2002 Glavich et al.
6,398,644 B1 6/2002 Perrie et al.
6,409,172 B1 6/2002 Vancura
6,409,602 B1 6/2002 Wilshire et al.
6,413,161 B1 7/2002 Baerlocher et al.
6,413,162 B1 7/2002 Baerlocher et al.
6,416,408 B2 7/2002 Tracy et al.
6,419,579 B1 7/2002 Bennett
6,428,412 B1 8/2002 Anderson et al.
6,439,993 B1 8/2002 O'Halloran
6,439,995 B1 8/2002 Hughs-Baird et al.
6,454,266 B1 9/2002 Breeding et al.
6,464,581 B1 10/2002 Yoseloff et al.
6,481,713 B2 11/2002 Perrie et al.
6,494,454 B2 12/2002 Adams
6,506,114 B1 1/2003 Estes et al.
6,514,141 B1 2/2003 Kaminkow et al.
6,517,432 B1 2/2003 Jaffe
6,517,433 B2 2/2003 Loose et al.
6,551,187 B1 4/2003 Jaffe
6,558,254 B2 5/2003 Baerlocher et al.
6,561,900 B1 5/2003 Baerlocher et al.
6,561,904 B2 5/2003 Locke et al.
6,565,433 B1 5/2003 Baerlocher et al.
6,575,830 B2 6/2003 Baerlocher et al.
6,585,591 B1 7/2003 Baerlocher et al.
6,589,114 B2 7/2003 Rose
6,602,136 B1 8/2003 Baerlocher et al.
6,602,137 B2 8/2003 Kaminkow et al.
6,604,740 B1 8/2003 Singer et al.
6,616,142 B2 9/2003 Adams
6,632,139 B1 10/2003 Baerlocher
6,632,140 B2 10/2003 Berman et al.
6,634,945 B2 10/2003 Glavich et al.
6,641,477 B1 11/2003 Dietz
6,643,943 B2 11/2003 Dall'Aglio et al.
6,644,663 B2 11/2003 Seelig et al.
6,659,864 B2 12/2003 McGahn et al.
6,666,767 B1 12/2003 Dayan
6,672,960 B1 1/2004 B-Jensen
6,676,511 B2 1/2004 Payne et al.
6,676,512 B2 1/2004 Fong et al.
6,695,696 B1 2/2004 Kaminkow
6,702,671 B2 3/2004 Tarantino
6,702,675 B2 3/2004 Poole et al.
6,712,693 B1 3/2004 Hettinger
6,719,630 B1 4/2004 Seelig et al.
6,726,204 B2 4/2004 Inoue
6,731,313 B1 5/2004 Kaminkow
6,733,386 B2 5/2004 Cuddy et al.
6,758,747 B2 7/2004 Baerlocher
6,780,109 B2 8/2004 Kaminkow
6,786,820 B2 9/2004 Gerrard et al.
6,802,775 B2 10/2004 Baerlocher et al.
6,805,349 B2 10/2004 Baerlocher et al.
6,808,454 B2 10/2004 Gerrard et al.
6,817,944 B2 11/2004 Kaminkow et al.
6,832,957 B2 12/2004 Falconer
6,835,133 B2 12/2004 Baerlocher et al.
6,837,788 B2 1/2005 Cannon
6,855,054 B2 2/2005 White et al.
6,866,583 B2 3/2005 Glavich et al.
6,875,106 B2 4/2005 Weiss et al.

(56) References Cited

U.S. PATENT DOCUMENTS

| | | | |
|---|---|---|---|
| 6,880,826 | B2 | 4/2005 | Inoue |
| 6,896,615 | B2 | 5/2005 | Berman |
| 6,896,617 | B2 | 5/2005 | Daly |
| 6,905,405 | B2 | 6/2005 | McClintic |
| 6,905,406 | B2 | 6/2005 | Kaminkow et al. |
| 6,908,383 | B2 | 6/2005 | Baerlocher et al. |
| 6,910,962 | B2 | 6/2005 | Marks et al. |
| 6,913,533 | B2 | 7/2005 | Cuddy et al. |
| 6,918,832 | B2 | 7/2005 | Baerlocher et al. |
| 6,921,335 | B2 | 7/2005 | Rodgers et al. |
| 6,923,441 | B2 | 8/2005 | Inoue |
| 6,929,952 | B2 | 8/2005 | Baerlocher |
| 6,932,700 | B2 | 8/2005 | Bennett et al. |
| 6,939,223 | B1 | 9/2005 | Jones |
| 6,942,571 | B1 | 9/2005 | McAllister et al. |
| 6,942,572 | B2 | 9/2005 | Inoue |
| 6,958,013 | B2 | 10/2005 | Miereau et al. |
| 6,960,133 | B1 | 11/2005 | Marks et al. |
| 6,971,955 | B2 | 12/2005 | Baerlocher et al. |
| 6,976,915 | B2 | 12/2005 | Baker et al. |
| 6,979,263 | B2 | 12/2005 | Baerlocher et al. |
| 6,981,635 | B1 | 1/2006 | Hughs-Baird et al. |
| 6,986,710 | B2 | 1/2006 | Baerlocher et al. |
| 6,988,947 | B2 | 1/2006 | Baerlocher et al. |
| 6,991,538 | B2 | 1/2006 | Cannon |
| 6,997,804 | B2 | 2/2006 | Berman |
| 6,997,808 | B2 | 2/2006 | Rodgers et al. |
| 7,001,274 | B2 | 2/2006 | Baerlocher et al. |
| 7,014,559 | B1 | 3/2006 | Fong |
| 7,014,560 | B2 | 3/2006 | Glavich et al. |
| 7,018,293 | B2 | 3/2006 | Brown et al. |
| 7,040,985 | B2 | 5/2006 | Vancura |
| 7,048,275 | B2 | 5/2006 | Adams |
| 7,052,395 | B2 | 5/2006 | Glavich et al. |
| 7,056,213 | B2 | 6/2006 | Ching et al. |
| 7,070,502 | B1 | 7/2006 | Bussick et al. |
| 7,074,127 | B2 | 7/2006 | Cuddy et al. |
| 7,077,744 | B2 | 7/2006 | Cannon |
| 7,077,745 | B2 | 7/2006 | Gomez et al. |
| 7,090,580 | B2 | 8/2006 | Rodgers et al. |
| 7,094,148 | B2 | 8/2006 | Baerlocher et al. |
| 7,104,886 | B2 | 9/2006 | Baerlocher et al. |
| 7,104,888 | B2 | 9/2006 | Miereau et al. |
| 7,108,602 | B2 | 9/2006 | Daly |
| 7,137,888 | B2 | 11/2006 | Glavich et al. |
| 7,144,322 | B2 | 12/2006 | Gomez et al. |
| 7,153,205 | B2 | 12/2006 | Baerlocher |
| 7,160,186 | B2 | 1/2007 | Cuddy et al. |
| 7,160,187 | B2 | 1/2007 | Loose et al. |
| 7,168,704 | B1 | 1/2007 | Lawless |
| 7,169,042 | B2 | 1/2007 | Muir et al. |
| 7,192,345 | B2 | 3/2007 | Muir et al. |
| 7,195,559 | B2 | 3/2007 | Gilmore et al. |
| 7,204,753 | B2 | 4/2007 | Ozaki et al. |
| 7,226,359 | B2 | 6/2007 | Bussick et al. |
| 7,236,113 | B1 | 6/2007 | Wang |
| 7,252,591 | B2 | 8/2007 | Van Asdale |
| 7,252,592 | B2 | 8/2007 | Rodgers et al. |
| 7,275,988 | B2 | 10/2007 | Aida et al. |
| 7,294,058 | B1 | 11/2007 | Slomiany et al. |
| 7,309,281 | B2 | 12/2007 | Baerlocher et al. |
| 7,309,282 | B2 | 12/2007 | Baerlocher et al. |
| 7,314,409 | B2 | 1/2008 | Maya et al. |
| 7,318,773 | B2 | 1/2008 | Baerlocher et al. |
| 7,331,862 | B2 | 2/2008 | Rodgers et al. |
| 7,331,866 | B2 | 2/2008 | Rodgers et al. |
| 7,335,102 | B2 | 2/2008 | Baerlocher et al. |
| 7,338,367 | B2 | 3/2008 | Kaminkow et al. |
| 7,357,713 | B2 | 4/2008 | Marks et al. |
| 7,371,168 | B2 | 5/2008 | Bilyeu et al. |
| 7,371,169 | B2 | 5/2008 | Baerlocher |
| 7,371,170 | B2 | 5/2008 | Cregan et al. |
| 7,396,279 | B2 | 7/2008 | Berman et al. |
| 7,399,225 | B2 | 7/2008 | Kaminkow |
| 7,402,102 | B2 | 7/2008 | Marks et al. |
| 7,419,431 | B2 | 9/2008 | Gauselmann et al. |
| 7,442,123 | B2 | 10/2008 | Brill et al. |
| 7,513,826 | B2 | 4/2009 | Cuddy |
| 7,553,231 | B2 | 6/2009 | Rodgers et al. |
| 7,559,837 | B1 | 7/2009 | Yoseloff et al. |
| 7,591,723 | B2 | 9/2009 | Cregan et al. |
| 7,749,063 | B2 | 7/2010 | Belger et al. |
| 7,789,751 | B2 | 9/2010 | Glavich et al. |
| 7,850,521 | B2 | 12/2010 | Rodgers et al. |
| 7,857,695 | B2 | 12/2010 | Rodgers et al. |
| 7,892,081 | B2 | 2/2011 | Glavich et al. |
| 8,002,625 | B2 | 8/2011 | Maya |
| 8,007,357 | B2 | 8/2011 | Cuddy et al. |
| 2002/0010017 | A1 | 1/2002 | Bennett |
| 2002/0052233 | A1 | 5/2002 | Gauselmann |
| 2002/0068623 | A1 | 6/2002 | Gauselmann |
| 2002/0077165 | A1 | 6/2002 | Bansemer et al. |
| 2002/0160836 | A1 | 10/2002 | Watanabe et al. |
| 2003/0013518 | A1 | 1/2003 | Graham |
| 2003/0045345 | A1 | 3/2003 | Bermin |
| 2003/0054874 | A1 | 3/2003 | Kaminkow |
| 2003/0057645 | A1 | 3/2003 | Baerlocher et al. |
| 2003/0060267 | A1 | 3/2003 | Glavich et al. |
| 2003/0092480 | A1 | 5/2003 | White et al. |
| 2003/0100356 | A1 | 5/2003 | Brown et al. |
| 2003/0125100 | A1 | 7/2003 | Cannon |
| 2003/0153382 | A1 | 8/2003 | Vancura |
| 2003/0157981 | A1 | 8/2003 | Marks et al. |
| 2003/0203752 | A1 | 10/2003 | Kaminkow et al. |
| 2003/0203753 | A1 | 10/2003 | Muir et al. |
| 2003/0207710 | A1 | 11/2003 | Rodgers et al. |
| 2004/0012145 | A1 | 1/2004 | Inoue |
| 2004/0014516 | A1 | 1/2004 | Inoue |
| 2004/0014517 | A1 | 1/2004 | Inoue |
| 2004/0018866 | A1 | 1/2004 | Inoue |
| 2004/0026854 | A1 | 2/2004 | Inoue |
| 2004/0033827 | A1 | 2/2004 | Gilmore et al. |
| 2004/0033829 | A1 | 2/2004 | Pacey et al. |
| 2004/0036218 | A1 | 2/2004 | Inoue |
| 2004/0038726 | A1 | 2/2004 | Inoue |
| 2004/0043809 | A1 | 3/2004 | Gomez et al. |
| 2004/0048650 | A1 | 3/2004 | Mierau et al. |
| 2004/0048651 | A1 | 3/2004 | Vorias et al. |
| 2004/0053669 | A1 | 3/2004 | Gerrard et al. |
| 2004/0053672 | A1 | 3/2004 | Baerlocher |
| 2004/0053676 | A1 | 3/2004 | Rodgers |
| 2004/0053677 | A1 | 3/2004 | Hughs-Baird |
| 2004/0067790 | A1 | 4/2004 | Petersoon et al. |
| 2004/0072612 | A1 | 4/2004 | Rodgers et al. |
| 2004/0092302 | A1 | 5/2004 | Gauselmann |
| 2004/0097280 | A1 | 5/2004 | Gauselmann |
| 2004/0102236 | A1 | 5/2004 | Suda et al. |
| 2004/0137981 | A1 | 7/2004 | Gauselmann et al. |
| 2004/0137982 | A1 | 7/2004 | Cuddy et al. |
| 2004/0147306 | A1 | 7/2004 | Randall et al. |
| 2004/0242313 | A1 | 12/2004 | Munoz |
| 2005/0020344 | A1 | 1/2005 | Kaminkow |
| 2005/0049035 | A1 | 3/2005 | Baerlocher et al. |
| 2005/0054405 | A1 | 3/2005 | Baerlocher et al. |
| 2005/0054418 | A1 | 3/2005 | Baerlocher |
| 2005/0054429 | A1 | 3/2005 | Baerlocher et al. |
| 2005/0059446 | A1 | 3/2005 | Kaminkow |
| 2005/0059474 | A1 | 3/2005 | O'Halloran |
| 2005/0059477 | A1 | 3/2005 | Baerlocher |
| 2005/0059478 | A1 | 3/2005 | Peterson et al. |
| 2005/0064924 | A1 | 3/2005 | Glavich et al. |
| 2005/0070354 | A1 | 3/2005 | Baerlocher et al. |
| 2005/0071023 | A1 | 3/2005 | Gilliland et al. |
| 2005/0096121 | A1 | 5/2005 | Gilliland et al. |
| 2005/0101372 | A1 | 5/2005 | Mierau et al. |
| 2005/0101380 | A1 | 5/2005 | Glavich et al. |
| 2005/0119403 | A1 | 6/2005 | St. Clair |
| 2005/0148381 | A1 | 7/2005 | Marks et al. |
| 2005/0148384 | A1 | 7/2005 | Marks et al. |
| 2005/0164774 | A1 | 7/2005 | Gauselmann |
| 2005/0187004 | A1 | 8/2005 | Vancura |
| 2005/0192081 | A1 | 9/2005 | Marks et al. |
| 2005/0208994 | A1 | 9/2005 | Berman |
| 2005/0227754 | A1 | 10/2005 | Kaminkow et al. |

(56) References Cited

U.S. PATENT DOCUMENTS

| | | | |
|---|---|---|---|
| 2005/0282620 | A1 | 12/2005 | Marks et al. |
| 2005/0288094 | A1 | 12/2005 | Marks et al. |
| 2006/0019738 | A1 | 1/2006 | Baerlocher et al. |
| 2006/0030387 | A1 | 2/2006 | Jackson |
| 2006/0030392 | A1 | 2/2006 | Rodgers et al. |
| 2006/0040728 | A1 | 2/2006 | Fuller |
| 2006/0046830 | A1 | 3/2006 | Webb |
| 2006/0058095 | A1 | 3/2006 | Berman et al. |
| 2006/0058097 | A1 | 3/2006 | Berman et al. |
| 2006/0063584 | A1 | 3/2006 | Brill et al. |
| 2006/0068875 | A1 | 3/2006 | Cregan et al. |
| 2006/0068882 | A1 | 3/2006 | Baerlocher et al. |
| 2006/0068883 | A1 | 3/2006 | Randall et al. |
| 2006/0068884 | A1 | 3/2006 | Baerlocher et al. |
| 2006/0068885 | A1 | 3/2006 | Cregan et al. |
| 2006/0073872 | A1 | 4/2006 | B-jensen et al. |
| 2006/0073876 | A1 | 4/2006 | Cuddy |
| 2006/0073879 | A1 | 4/2006 | Baerlocher |
| 2006/0084492 | A1 | 4/2006 | Baerlocher et al. |
| 2006/0084493 | A1 | 4/2006 | Pederson et al. |
| 2006/0084494 | A1 | 4/2006 | Belger et al. |
| 2006/0084498 | A1 | 4/2006 | Baerlocher et al. |
| 2006/0089191 | A1 | 4/2006 | Singer et al. |
| 2006/0111174 | A1 | 5/2006 | Baerlocher et al. |
| 2006/0116195 | A1 | 6/2006 | Baerlocher et al. |
| 2006/0135247 | A1 | 6/2006 | Baerlocher et al. |
| 2006/0172795 | A1 | 8/2006 | Bussick et al. |
| 2006/0172796 | A1 | 8/2006 | Bussick et al. |
| 2006/0199636 | A1 | 9/2006 | Ching et al. |
| 2006/0199637 | A1 | 9/2006 | Ching et al. |
| 2006/0264254 | A1 | 11/2006 | Aoki |
| 2007/0004489 | A1 | 1/2007 | Rodgers et al. |
| 2007/0010316 | A1 | 1/2007 | Baerlocher et al. |
| 2007/0021175 | A1 | 1/2007 | Baerlocher et al. |
| 2007/0021187 | A1 | 1/2007 | Gauselmann |
| 2007/0021188 | A1 | 1/2007 | Rodgers et al. |
| 2007/0026923 | A1 | 2/2007 | Muir |
| 2007/0060246 | A1 | 3/2007 | Baerlocher et al. |
| 2007/0060248 | A1 | 3/2007 | Rodgers et al. |
| 2007/0060255 | A1 | 3/2007 | Rodgers et al. |
| 2007/0060294 | A1 | 3/2007 | Cuddy et al. |
| 2007/0087812 | A1 | 4/2007 | Glavich et al. |
| 2007/0232382 | A1 | 10/2007 | Berman |
| 2007/0232383 | A1 | 10/2007 | Berman |
| 2007/0287523 | A1 | 12/2007 | Esses et al. |
| 2008/0045322 | A1 | 2/2008 | Berman |
| 2008/0045323 | A1 | 2/2008 | Berman |
| 2008/0051174 | A1 | 2/2008 | Fiden |
| 2008/0064485 | A1 | 3/2008 | Tedsen et al. |
| 2008/0090655 | A1 | 4/2008 | Marks |
| 2008/0102931 | A1 | 5/2008 | Marks |
| 2008/0108411 | A1 | 5/2008 | Marks |
| 2008/0113735 | A1 | 5/2008 | Jensen et al. |
| 2008/0113765 | A1 | 5/2008 | DeWall |
| 2008/0132320 | A1 | 6/2008 | Rodgers |
| 2008/0139298 | A1 | 6/2008 | Rodgers |
| 2008/0161097 | A1 | 7/2008 | Rodgers et al. |
| 2008/0176620 | A1 | 7/2008 | Baerlocher et al. |
| 2008/0176634 | A1 | 7/2008 | Berman et al. |
| 2008/0200232 | A1 | 8/2008 | Baerlocher et al. |
| 2008/0207305 | A1 | 8/2008 | Baerlocher et al. |
| 2008/0214283 | A1 | 9/2008 | Cregan et al. |
| 2008/0227541 | A1 | 9/2008 | Berman et al. |
| 2008/0268941 | A1 | 10/2008 | Kaminkow |
| 2008/0287178 | A1 | 11/2008 | Berman et al. |
| 2008/0287179 | A1 | 11/2008 | Berman et al. |
| 2009/0124325 | A1 | 5/2009 | Wadleigh et al. |
| 2009/0170592 | A1 | 7/2009 | Cuddy |
| 2010/0004049 | A1 | 1/2010 | Ching et al. |
| 2010/0004050 | A1 | 1/2010 | Caputo et al. |
| 2010/0022297 | A1 | 1/2010 | Saunders |
| 2010/0120507 | A1 | 5/2010 | Rodgers et al. |
| 2010/0124972 | A1 | 5/2010 | Rodgers et al. |
| 2011/0086695 | A1 | 4/2011 | Evans |
| 2011/0111825 | A1 | 5/2011 | Caputo |
| 2011/0130193 | A1 | 6/2011 | Belger et al. |

FOREIGN PATENT DOCUMENTS

| | | |
|---|---|---|
| AU | 2000069612 | 2/2001 |
| EP | 0 058 488 | 8/1982 |
| EP | 0 060 019 | 9/1982 |
| EP | 0 874 337 | 10/1998 |
| EP | 0 981 119 | 2/2000 |
| EP | 0 984 408 | 3/2000 |
| EP | 1 063 622 | 12/2000 |
| EP | 1 184 822 | 3/2002 |
| EP | 1 205 894 | 5/2002 |
| EP | 1 422 673 | 5/2004 |
| EP | 1 513 117 | 3/2005 |
| GB | 1 454 046 | 10/1976 |
| GB | 2 062 922 | 5/1981 |
| GB | 2 106 293 | 9/1981 |
| GB | 2 081 952 | 2/1982 |
| GB | 2 090 690 | 7/1982 |
| GB | 2 096 376 | 10/1982 |
| GB | 2 097 160 | 10/1982 |
| GB | 2 100 905 | 1/1983 |
| GB | 2 105 891 | 3/1983 |
| GB | 2 106 295 | 4/1983 |
| GB | 2 113 881 | 8/1983 |
| GB | 2 117 155 | 10/1983 |
| GB | 2 137 392 | 10/1984 |
| GB | 2 161 008 | 1/1986 |
| GB | 2 165 385 | 4/1986 |
| GB | 2 170 636 | 8/1986 |
| GB | 2 170 643 | 8/1986 |
| GB | 2 180 087 | 3/1987 |
| GB | 2 181 589 | 4/1987 |
| GB | 2 183 882 | 6/1987 |
| GB | 2 191 030 | 12/1987 |
| GB | 2 222 712 | 3/1990 |
| GB | 2 225 889 | 6/1990 |
| GB | 2 226 436 | 6/1990 |
| GB | 2 242 300 | 9/1991 |
| GB | 2 243 236 | 10/1991 |
| GB | 2 262 642 | 6/1993 |
| GB | 2 322 217 | 8/1998 |
| GB | 2 335 524 | 9/1999 |
| GB | 2 372 132 | 2/2001 |
| GB | 2 372 617 | 8/2002 |
| GB | 2 393 555 | 3/2004 |
| WO | WO 97/32285 | 9/1997 |
| WO | WO 98/20949 | 5/1998 |
| WO | WO 00/30727 | 6/2000 |
| WO | WO 00/32286 | 6/2000 |
| WO | WO 00/66235 | 11/2000 |
| WO | WO 00/76606 | 12/2000 |
| WO | WO 01/26019 | 4/2001 |
| WO | WO 03/026756 | 4/2003 |
| WO | WO 2004/025584 | 3/2004 |
| WO | WO 2005/028043 | 3/2005 |
| WO | WO 2006/076294 | 7/2006 |
| WO | WO 2007/002935 | 1/2007 |
| WO | WO 2007/053349 | 5/2007 |
| WO | WO 2007/084766 | 7/2007 |
| WO | WO 2007/130443 | 11/2007 |
| WO | WO 2007/130444 | 11/2007 |

GAMING SYSTEM, GAMING DEVICE, AND METHOD PROVIDING A GAME INCLUDING A CASCADING SYMBOLS FEATURE CAUSING ONE OR MORE REPOSITIONED SYMBOLS TO BE WILD SYMBOLS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines that provide players awards in primary or base games are well known. These gaming machines generally require a player to place a wager to activate a play of the primary game. For many of these gaming machines, any award provided to a player for a wagered-on play of a primary game is based on the player obtaining a winning symbol or a winning symbol combination and on the amount of the wager (e.g., the higher the wager, the higher the award). Winning symbols or winning symbol combinations that are less likely to occur usually provide higher awards.

For such known gaming machines, the amount of the wager placed on the primary game by the player may vary. For instance, the gaming machine may enable the player to wager a minimum number of credits, such as one credit (e.g., one cent, nickel, dime, quarter, or dollar) up to a maximum quantity of credits, such as five credits. This wager may be placed by the player a single time or multiple times in a single play of the primary game. For instance, gaming machine configured to operate a slot game may have one or more paylines, and the gaming machine may enable a player to place a wager on each payline for a single play of the slot game. Thus, it is known that a gaming machine, such as one configured to operate a slot game, may enable players to place wagers of substantially different amounts on each play of the primary game ranging, for example, from one credit up to 125 credits (e.g., five credits on each of twenty-five separate paylines). This is also true for other wagering games, such as video draw poker, where players can place wagers of one or more credits on each hand, and where multiple hands can be played simultaneously. Accordingly, it should be appreciated that different players play at substantially different wagering amounts or levels and at substantially different rates of play.

Gaming machines that provide cascading symbol games as primary games are also known. In one such cascading symbol game, a gaming machine generates and displays a plurality of symbols at a plurality of symbol positions. The gaming machine evaluates the displayed symbols and provides an award for each of any displayed winning symbol combinations. The gaming machine then removes the displayed symbols that form the winning symbol combination or combinations to create one or more empty symbol positions. The gaming machine shifts zero, one, or more of the remaining displayed symbols downward into zero, one, or more of the empty symbol positions. If any empty symbol positions remain, the gaming machine generates and displays a symbol at each empty symbol position. The gaming machine reevaluates the displayed symbols and provides an award for each of any displayed winning symbol combinations. The gaming machine repeats the steps of removing generated symbols, shifting generated symbols, generating new symbols if winning symbol combinations continue to be formed, and evaluating generated symbols.

There is a continuing need to increase player enjoyment and excitement by providing wagering games that utilize new cascading symbol features.

SUMMARY

Various embodiments of the present disclosure provide a gaming system, gaming device, and method providing a game including a cascading symbols feature causing one or more repositioned symbols to be wild symbols. The gaming system is configured to operate a primary game including a plurality of symbol display areas, each of which is configured to display one of a plurality of symbols. In operation, after receiving a wager from a player for a play of the primary game, the gaming system generates and displays one of the symbols at each of the symbol display areas. The gaming system determines whether the displayed symbols form any of a plurality of winning symbol combinations, and determines any awards associated with any displayed winning symbol combinations.

If a triggering event occurs, the gaming system determines a set of at least one of the displayed symbols. For each displayed symbol of the set of the displayed symbols, the gaming system removes that displayed symbol, resulting in an empty symbol display area. That is, the gaming system removes that displayed symbol from the symbol display area at which that displayed symbol is displayed. For each empty symbol display area, the gaming system: (a) repositions zero, one, or a plurality of the other displayed symbols, which creates zero, one, or a plurality of second empty symbol display areas; and (b) causes at least one of any repositioned symbols to be a wild symbol. The gaming system generates and displays one of the plurality of symbols at each of any empty symbol display areas (i.e., at each of any empty symbol display areas that previously displayed one of the removed symbols and at each of any second empty symbol display areas that previously displayed one of the repositioned symbols). The gaming system determines whether the displayed symbols form any of the winning symbol combinations, and determines any additional awards associated with any displayed winning symbol combinations. The gaming system provides any determined awards and any determined additional awards to the player.

Additional features and advantages are described herein, and will be apparent from, the following Detailed Description and the Figures.

DETAILED DESCRIPTION

Gaming Device and Electronics

The present disclosure may be implemented in various configurations for gaming machines, gaming devices, or gaming systems, including but not limited to: (1) a dedicated gaming machine, gaming device, or gaming system wherein the computerized instructions for controlling any games (that are provided by the gaming machine or gaming device) are provided with the gaming machine or gaming device prior to delivery to a gaming establishment; and (2) a changeable gaming machine, gaming device, or gaming system wherein the computerized instructions for controlling any games (that are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling the base or primary game of the present disclosure are communicated from the central server to the gaming device in a thick client configuration and computerized instructions for controlling any secondary or bonus games or functions are executed by a central server in a thin client configuration.

Figure 1A:
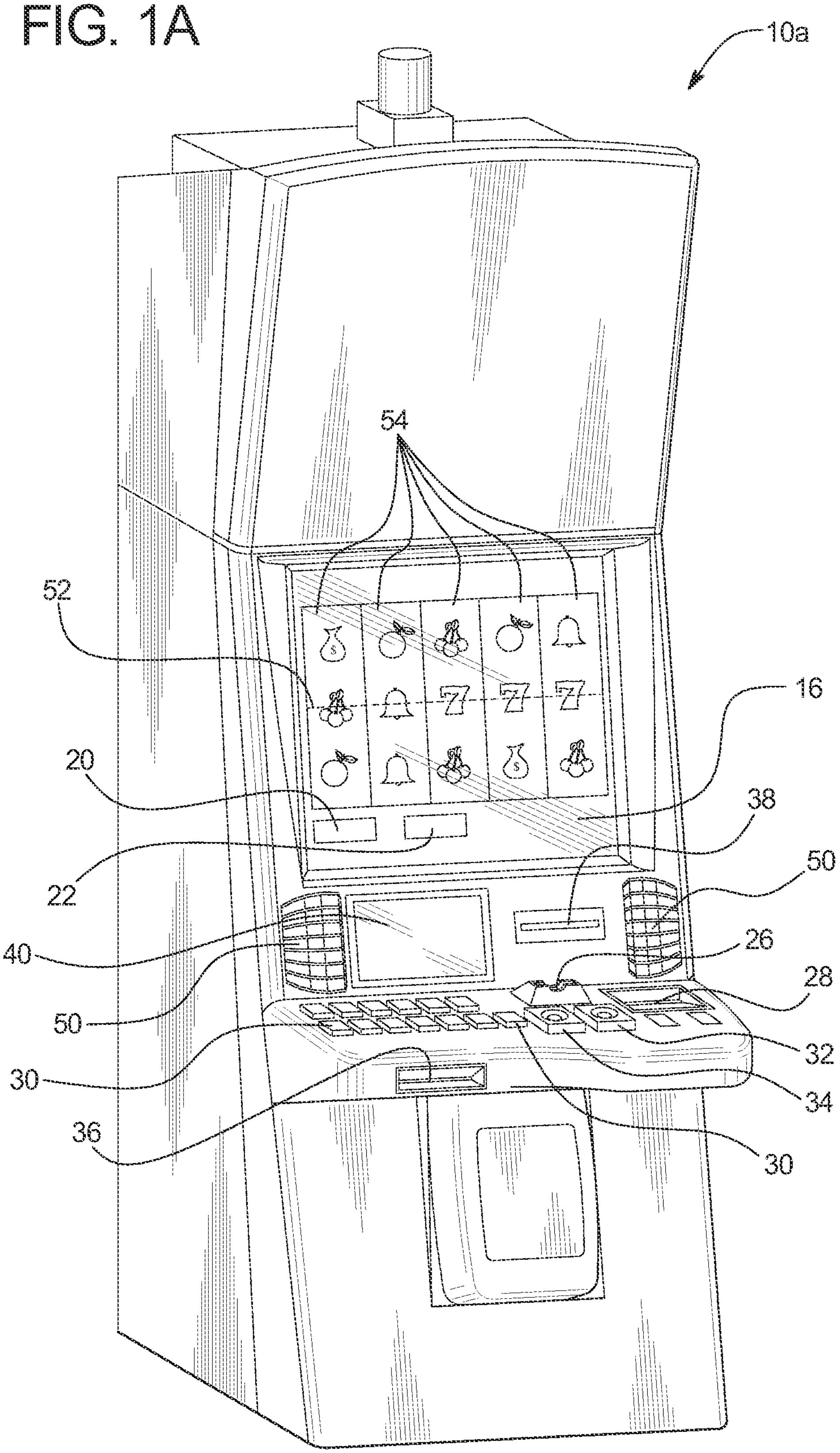
FIGS. 1A and 1B are perspective views of example alternative embodiments of a gaming device of the gaming system of the present disclosure.
Figure 1B:
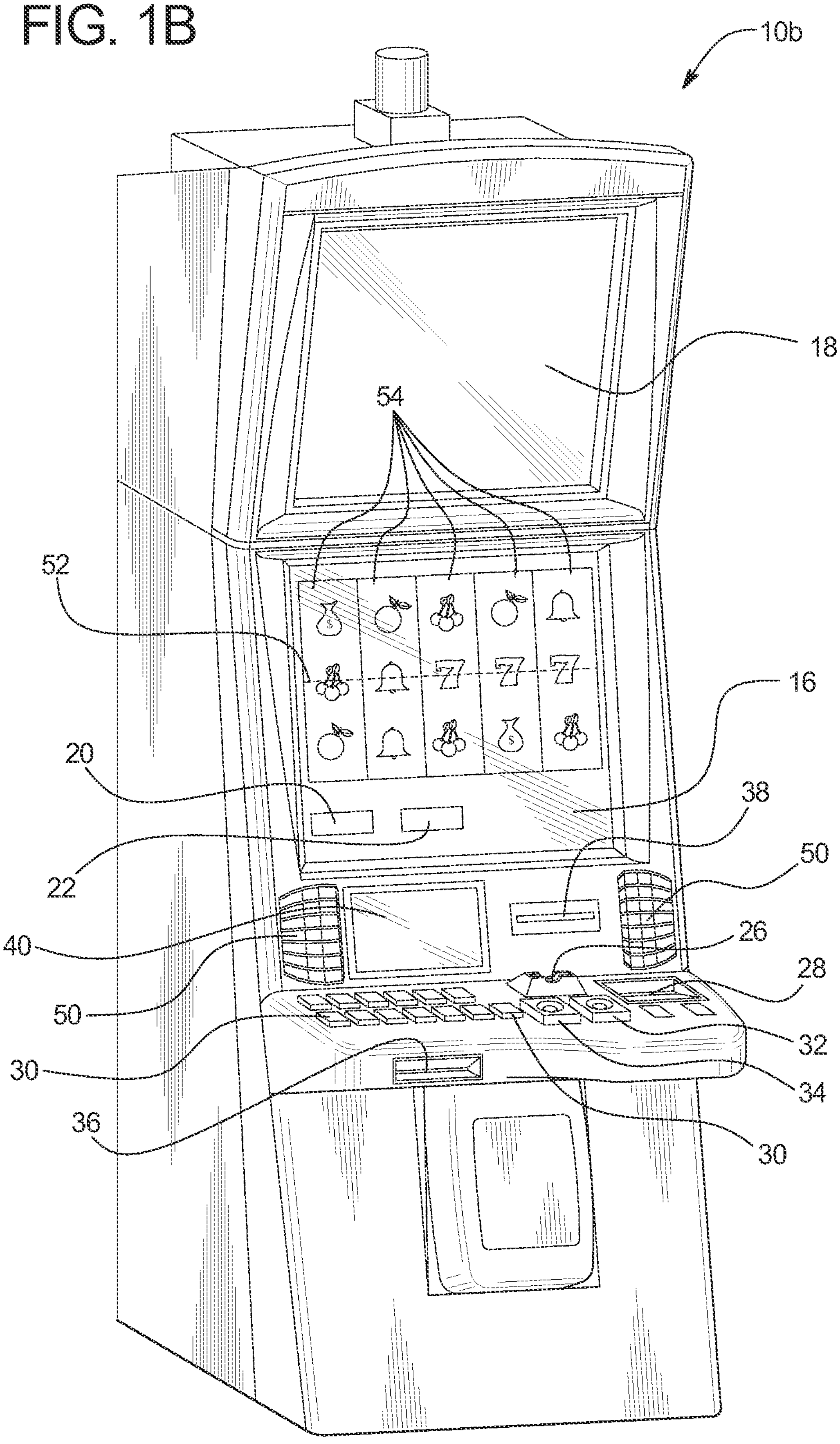

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet that provides support for a plurality of displays, inputs, controls, and other features of a conventional gaming machine. It is configured so that a player may operate it while standing or sitting. The gaming device may be positioned on a base or stand or may be configured as a pub-style table-top game (not shown) that a player may operate preferably while sitting. As illustrated by the different configurations shown in FIGS. 1A and 1B, the gaming device may have varying cabinet and display configurations.

Figure 2A:
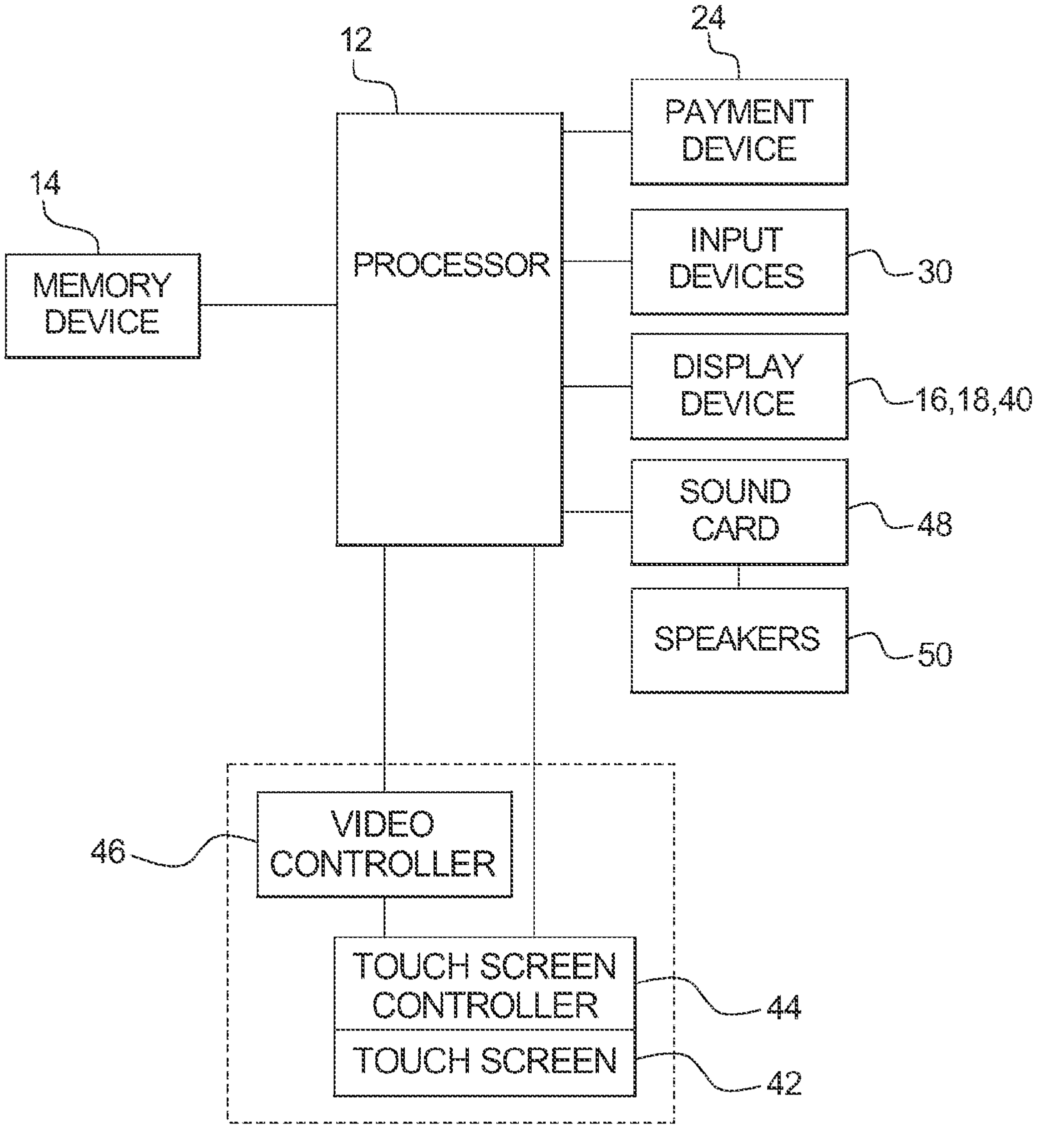
FIG. 2A is a schematic block diagram of one embodiment of an electronic configuration for one of the gaming devices of the gaming system disclosed herein.

In one embodiment, as illustrated in FIG. 2A, the gaming device includes at least one processor 12, such as a microprocessor, a microcontroller-based platform, a suitable integrated circuit, or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which may include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above may be stored in a detachable or removable memory device, such as, but not limited to, a suitable cartridge, disk, CD ROM, DVD, non-transitory computer readable medium, or USB memory device. In other embodiments, part or all of the program code and/or operating data described above may be downloaded to the memory device through a suitable network.

In one embodiment, an operator or a player may use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, such as part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 that displays any suitable base or primary game. This display device may also display any suitable secondary or bonus game associated with the base or primary game as well as information relating to the base or primary game or the secondary or bonus game. The alternative embodiment shown in FIG. 1B includes a central display device 16 and an upper display device 18. The upper display device may display the base or primary game, any suitable secondary or bonus game associated or not associated with the base or primary game, and/or information relating to the base or primary game or the secondary or bonus game. These display devices may also serve as digital glass operable to advertise games or other aspects of the gaming establishment. As shown in FIGS. 1A and 1B, in one embodiment, the gaming device includes a credit display 20 that displays a player's current number of credits, cash, account balance, or the equivalent. In one embodiment, the gaming device includes a bet display 22 that displays a player's amount wagered. In one embodiment, as discussed in more detail below, the gaming device includes a player tracking display 40 that displays information regarding a player's play tracking status.

In another embodiment, at least one display device may be a mobile display device, such as a PDA or tablet PC, that enables play of at least a portion of the base or primary game or the secondary or bonus game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle, or an elongated rectangle.

The display devices of the gaming device are configured to display at least one and preferably a plurality of game or other suitable images, symbols, and indicia such as any visual representation or exhibition of the movement of objects such as mechanical, virtual, or video reels and wheels; dynamic lighting; video images; images of people, characters, places, things, or faces of cards; and the like.

In one alternative embodiment, the symbols, images, and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As shown in FIGS. 1A and 1B, a payment device such as a payment acceptor includes a note, ticket, or bill acceptor 28, into which the player inserts paper money, a ticket, or voucher and a coin slot 26 into which the player inserts money, coins, or tokens. In other embodiments, payment devices such as readers or validators for credit cards, debit cards, or credit slips may accept payment. In one embodiment, a player may insert an identification card into a card reader of the gaming device. In one embodiment, the identification card is a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, that communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as discussed above.

As shown in FIGS. 1A, 1B, and 2A, in one embodiment the gaming device includes at least one and preferably a plurality of input devices 30 in communication with the processor. The input devices may include any suitable device that enables the player to produce an input signal that is received by the processor. In one embodiment, after appropriate funding of the gaming device, the input device is a game activation device, such as a play button 32 or a pull arm (not shown) that is used by the player to start the base or primary game or sequence of events in the gaming device. The play button may be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player may increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) that enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as shown in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player may make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as shown in FIG. 2A, the gaming device includes a sound generating device controlled by one or more sound cards 48 that function in conjunction with the processor. In one embodiment, the sound generating device includes at least one and preferably a plurality of speakers 50 or other sound generating hardware and/or software for generating sounds, such as by playing music for the base or primary game and/or the secondary or bonus game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera and to display the visible manifestation of the game in split screen or picture-in-picture fashion. For example, the camera may acquire an image of the player and the processor may incorporate that image into the base or primary game and/or the secondary or bonus game as a game image, symbol, or indicia.

Gaming device 10 incorporates the base or primary game and any secondary or bonus game associated with the base or primary game. The gaming machine or device may include some or all of the features of conventional gaming machines or devices. The gaming device may incorporate any suitable reel-type game susceptible to representation in an electronic or electromechanical form as the base or primary game. The gaming device may incorporate any suitable reel-type game, card game, cascading or falling symbol game, number game, or other game of chance susceptible to representation in an electronic or electromechanical form as a secondary or bonus game or feature, which in one embodiment produces a random outcome based on probability data at the time of or after placement of a wager. That is, different secondary or bonus games, such as video poker games, video blackjack games, video keno games, and video bingo games may be implemented.

In one embodiment, the base or primary game and/or the secondary or bonus game includes one or more paylines 52 associated with a plurality of symbol display positions. The paylines may be horizontal, vertical, circular, diagonal, angled, or any combination thereof. In this embodiment, the gaming device includes at least one and preferably a plurality of reels 54, such as three to five reels, in either electromechanical form with mechanical rotating reels or video form with simulated reels and movement thereof. In one embodiment, an electromechanical slot machine includes a plurality of adjacent, rotatable reels that may be combined and operably coupled with an electronic display of any suitable type. In another embodiment, if the reels are in video form, one or more of the display devices, as discussed above, displays the plurality of simulated video reels. Each reel displays a plurality of indicia or symbols, such as bells, hearts, fruits, numbers, letters, bars, or other images that preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels stop spinning if specified types and/or configurations of indicia or symbols occur on an active payline or otherwise occur in a winning pattern, occur on the requisite number of adjacent reels, and/or occur in a scatter pay arrangement.

In an alternative embodiment, rather than determining any outcome to provide to the player by analyzing the symbols generated on any wagered upon paylines as discussed above, the gaming device determines any outcome to provide to the player based on the number of associated symbols that are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if a reel is activated based on the player's wager, then each of the symbol positions of that reel will be activated and each of the active symbol positions will be part of one or more of the ways to win. In one embodiment, if a reel is not activated based on the player's wager, then a designated number of default symbol positions, such as a single symbol position of the middle row of the reel, will be activated and the default symbol position(s) will be part of one or more of the ways to win. This type of gaming machine enables a player to wager on one, more than one, or all of the reels, and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as discussed above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as discussed above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols that form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as discussed above for each of the remaining classified strings of related symbols that were previously classified or formed from related symbols on the first and second reels.

After analyzing each of the remaining strings of related symbols, the gaming device determines, for each remaining pending or incomplete string of related symbols, if any of the symbols from the next adjacent reel should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, the secondary or bonus game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table that utilizes conventional poker hand rankings to determine the winning hands. The gaming device provides the player with an award based on a winning hand and the number of credits the player wagered.

In another embodiment, the secondary or bonus game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, the secondary or bonus game may be a keno game wherein the gaming device displays a plurality of selectable indicia or numbers on at least one of the display devices. In this embodiment, the player selects at least one of a plurality of the selectable indicia or numbers via an input device such as a touch screen. The gaming device then displays a series of drawn numbers and determines an amount of matches, if any, between the player's selected numbers and the gaming device's drawn numbers. The player is provided an award based on the amount of matches, if any, based on the amount of determined matches and the number of numbers drawn.

In one embodiment, as noted above, in addition to winning credits or other awards in the base or primary game, the gaming device may also give players the opportunity to win credits in a secondary or bonus game or in a secondary or bonus round. The secondary or bonus game enables the player to obtain a prize or payout in addition to the prize or payout, if any, obtained from the base or primary game. In general, a secondary or bonus game produces a significantly higher level of player excitement than the base or primary game because it provides a greater expectation of winning than the base or primary game, and is accompanied with more attractive or unusual features than the base or primary game. In one embodiment, the secondary or bonus game may be any type of suitable game, either similar to or completely different from the base or primary game.

In one embodiment, the triggering event or qualifying condition may be a selected outcome in the base or primary game or a particular arrangement of one or more indicia on a display device in the base or primary game, such as a bonus symbol appearing on three adjacent reels along a payline in the base or primary game. In other embodiments, the triggering event or qualifying condition occurs based on exceeding a certain amount of game play (such as number of games, number of credits, amount of time), or reaching a specified number of points earned during game play.

In another embodiment, gaming device processor 12 or central controller 56 randomly provides the player one or more plays of one or more secondary or bonus games. In one such embodiment, the gaming device does not provide any apparent reason to the player for qualifying to play a secondary or bonus game. In this embodiment, qualifying for a secondary or bonus game is not triggered by an event in or based specifically on any of the plays of the base or primary game. That is, the gaming device may simply qualify a player to play a secondary or bonus game without any explanation or alternatively with simple explanations. In another embodiment, the gaming device (or central server) qualifies a player for a secondary or bonus game at least partially based on a game triggered or symbol triggered event, such as at least partially based on the play of the base or primary game.

In one embodiment, the gaming device includes a program that will automatically begin a secondary or bonus round after the player has achieved a triggering event or qualifying condition in the base or primary game. In another embodiment, after a player has qualified for a secondary or bonus game, the player may subsequently enhance the player's secondary or bonus game participation through continued play of the base or primary game. Thus, for each secondary or bonus qualifying event, such as a bonus symbol, that the player obtains, a given number of secondary or bonus game wagering points or credits may be accumulated in a "bonus meter" programmed to accrue the secondary or bonus wagering credits or entries toward eventual participation in a secondary or bonus game. The occurrence of multiple such secondary or bonus qualifying events in the base or primary game may result in an arithmetic or exponential increase in the number of secondary or bonus wagering credits awarded. In one embodiment, the player may redeem extra secondary or bonus wagering credits during the secondary or bonus game to extend play of the secondary or bonus game.

In one embodiment, no separate entry fee or buy-in for a secondary or bonus game is needed. That is, a player may not purchase entry into a secondary or bonus game; rather, the player must win or earn entry through play of the base or primary game, thus encouraging play of the base or primary game. In another embodiment, qualification of the secondary or bonus game is accomplished through a simple "buy-in" by the player—for example, if the player has been unsuccessful at qualifying through other specified activities. In another embodiment, the player must make a separate side-wager on the secondary or bonus game or wager a designated amount in the base or primary game to qualify for the secondary or bonus game. In this embodiment, the secondary or bonus game triggering event must occur and the side-wager (or designated base or primary game wager amount) must have been placed to trigger the secondary or bonus game.

Figure 2B:
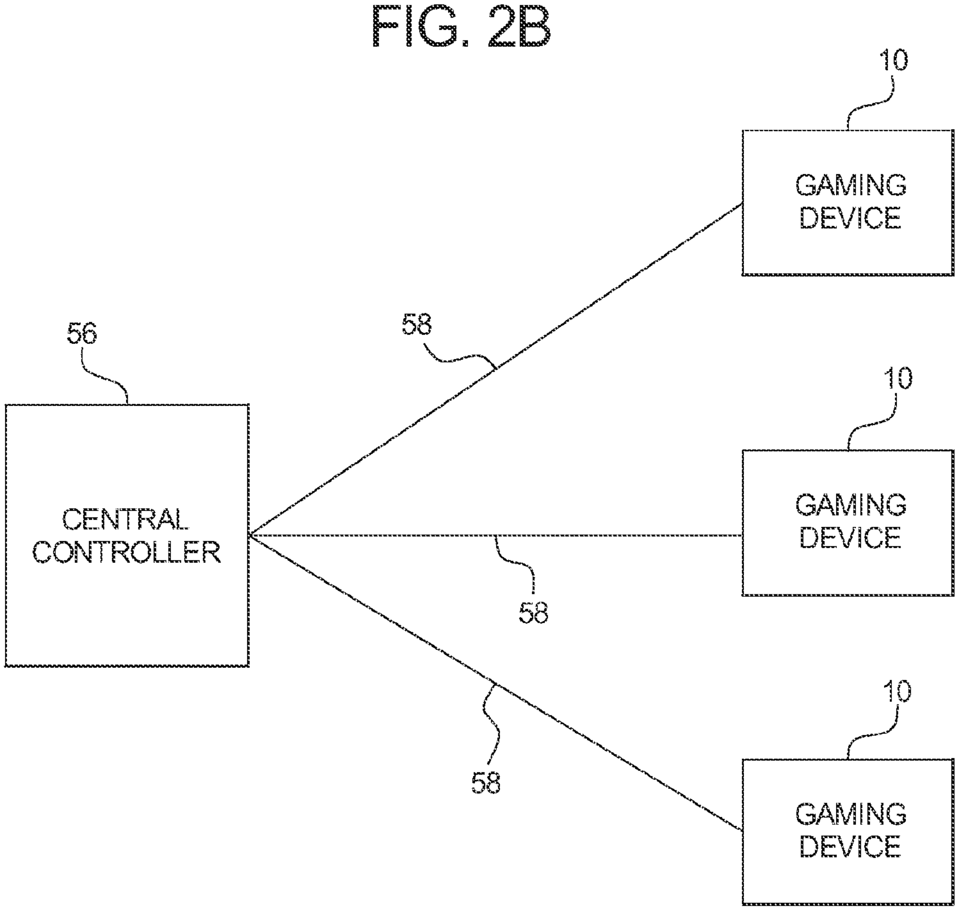
FIG. 2B is a schematic block diagram of one embodiment of a network configuration for a plurality of gaming devices of the gaming system disclosed herein.

In one embodiment, as illustrated in FIG. 2B, one or more of gaming devices 10 are in communication with each other and/or at least one central controller 56 through a data network or remote communication link 58. In this embodiment, the central server, central controller, or remote host is any suitable server or computing device that includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more, or each of the functions of the central controller, central server, or remote host as disclosed herein may be performed by one or more gaming device processors. It should be further appreciated that one, more, or each of the functions of one or more gaming device processors as disclosed herein may be performed by the central controller, central server, or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the base or primary game based on probability data. In another embodiment, the central server or controller randomly generates a game outcome for the secondary or bonus game based on probability data. In another embodiment, the central server or controller randomly generates a game outcome for both the base or primary game and the secondary or bonus game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome may include a base or primary game outcome, a secondary or bonus game outcome, base or primary game and secondary or bonus game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control may assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the base or primary game or the secondary or bonus game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination may be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As discussed above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10, which will be provided to a first player regardless of how the first player plays in a first stage, and a second gaming device to have selected elements marked in a different predetermined pattern is provided a second outcome of win $2, which will be provided to a second player regardless of how the second player plays a second stage. It should be appreciated that as the process of marking selected elements continues until one or more predetermined patterns are marked, this embodiment ensures that at least one bingo card will win the bingo game, and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as discussed above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card that has an encoded player identification number that uniquely identifies the player. When a player inserts the player's playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes the player's player tracking card when concluding play for that gaming session. In another embodiment, rather than requiring a player to insert a player tracking card, the gaming device utilizes one or more portable devices carried by a player, such as a cell phone, a radio frequency identification tag, or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) that are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device may be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as discussed above, one or more gaming devices are in communication with a central server or controller. The central server or controller may be any suitable server or computing device that includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game that may be played on one or more of the gaming devices in the gaming system. Such different games may include the same or substantially the same game play with different pay tables. In different embodiments, the executable game program is for the base or primary game, a secondary or bonus game, or both. In another embodiment, the game program may be executable as a secondary or bonus game to be played simultaneous with the play of the base or primary game (that may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate the base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of the base or primary game. That is, a player is provided a progressive award without any explanation or, alternatively, with simple explanations. In another embodiment, a player is provided a progressive award at least partially based on a game triggered or symbol triggered event, such as at least partially based on the play of the base or primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager any credit amount during the base or primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the base or primary game of the gaming machines in the gaming system, via a gaming establishment or via any suitable manner.

In another embodiment, one or more of the progressive awards are partially funded via a side-bet or side-wager that the player may make (and that may be tracked via a side-bet meter). In one embodiment, one or more of the progressive awards are funded with only side-bets or side-wagers placed. In another embodiment, one or more of the progressive awards are funded based on players' wagers as discussed above as well as any side-bets or side-wagers placed.

In one alternative embodiment, a minimum wager level is required for a gaming device to qualify to be selected to obtain one of the progressive awards. In one embodiment, this minimum wager level is the maximum wager level for the base or primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, among the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Game Including a Cascading Symbols Feature Causing One or More Repositioned Symbols to be Wild Symbols Various embodiments of the present disclosure provide a gaming system, gaming device, and method providing a game including a cascading symbols feature causing one or more repositioned symbols to be wild symbols. In general, the gaming system is configured to operate a primary wagering game (referred to herein as the "primary game") including a plurality of symbol display areas, each of which is configured to display one of a plurality of symbols. In operation, after receiving a wager from a player for a play of the primary game, the gaming system generates and displays one of the symbols at each of the symbol display areas. The gaming system determines whether the displayed symbols form any of a plurality of winning symbol combinations, and determines any awards associated with any displayed winning symbol combinations.

If a triggering event occurs, the gaming system determines a set of at least one of the displayed symbols. For each displayed symbol of the set of the displayed symbols, the gaming system removes that displayed symbol, resulting in an empty symbol display area. That is, the gaming system removes that displayed symbol from the symbol display area at which that displayed symbol is displayed. For each empty symbol display area, the gaming system: (a) repositions zero, one, or a plurality of the other displayed symbols, which creates zero, one, or a plurality of second empty symbol display areas; and (b) causes at least one of any repositioned symbols to be a wild symbol. The gaming system generates and displays one of the plurality of symbols at each of any empty symbol display areas (i.e., at each of any empty symbol display areas that previously displayed one of the removed symbols and at each of any second empty symbol display areas that previously displayed one of the repositioned symbols). The gaming system determines whether the displayed symbols form any of the winning symbol combinations, and determines any additional awards associated with any displayed winning symbol combinations. The gaming system provides any determined awards and any determined additional awards to the player.

FIGS. 3A, 3B, 3C, 3D, 3E, 3F, 3G, and 3H illustrate screen shots of one embodiment of the gaming system and gaming device of the present disclosure (referred to herein as the "gaming system") providing a primary game including a cascading symbols feature that causes one or more repositioned symbols to be wild symbols. In this example, the gaming system includes a display device 120 that displays the primary game including a plurality of symbol display areas 130*a*, 130*b*, 130*c*, 130*d*, 130*e*, 130*f*, 130*g*, 130*h*, 130*i*, 130*j*, 130*k*, 130*l*, 130*m*, 130*n*, and 130*o*, each of which is configured to display one of a plurality of symbols.

Display device 120 displays a plurality of paylines for the primary game, each of which is associated with a different plurality of the symbol display areas. Specifically, payline A 132*a* is associated with symbol display areas 130*a*, 130*b*, 130*c*, 130*d*, and 130*e*; payline B 132*b* is associated with symbol display areas 130*a*, 130*b*, 130*h*, 130*n*, and 130*o*; payline C 132*c* is associated with symbol display areas 130*f*, 130*g*, 130*h*, 130*i*, and 130*j*; payline D 132*d* is associated with symbol display areas 130*k*, 130*l*, 130*h*, 130*d*, and 130*e*; and payline E 132*e* is associated with symbol display areas 130*k*, 130*l*, 130*m*, 130*n*, and 130*o*. Payline A 132*a*, payline B 132*b*, payline C 132*c*, payline D 132*d*, and payline E 132*e* are sometimes referred to herein as paylines A, B, C, D, and E.

Display device 120 displays a paytable 122 for the primary game that includes a plurality of winning symbol combinations. Paytable 122 indicates the credit payout associated with each respective winning symbol combination. In this example, paytable 122 indicates the credit payout associated with each respective winning symbol combination when the maximum wager, which is 50 credits in this example (but could be any suitable amount), is placed by a player for a play of the primary game. More specifically, winning symbol combination SEVEN-SEVEN-SEVEN-SEVEN-SEVEN is associated with an award of 10,000 credits; winning symbol combination DIAMOND-DIAMOND-DIAMOND-DIAMOND is associated with an award of 7,500 credits, winning symbol combination DOLLAR SIGN-DOLLAR SIGN-DOLLAR SIGN-DOLLAR SIGN-DOLLAR SIGN is associated with an award of 5,000 credits; winning symbol combination TRIPLE BAR-TRIPLE BAR-TRIPLE BAR-TRIPLE BAR is associated with an award of 2,000 credits; winning symbol combination ORANGE-ORANGE-ORANGE-ORANGE is associated with an award of 500 credits; winning symbol combination TRIPLE CHERRY-TRIPLE CHERRY-TRIPLE CHERRY is associated with an award of 250 credits; winning symbol combination BAR-BAR-BAR is associated with an award of 100 credits; and winning symbol combination CHERRY-CHERRY-CHERRY is associated with an award of 50 credits.

It should be appreciated that, in various embodiments: (a) the primary game may include, and the display device may display, any suitable quantity of symbol display areas in any suitable configuration or arrangement; (b) the primary game may include, and the display device may display, any suitable quantity of paylines for the primary game; (c) each of the displayed paylines may be associated with any suitable quantity of the symbol display areas and any suitable combination of the symbol display areas; (d) the gaming system may use any other suitable award determination other than a payline evaluation, such as a ways to win and/or a scatter pay award determination (described in detail above); (e) the paytable may be modified to reflect lower credit payouts when a wager that is less than the maximum wager is placed on a play of the primary game; (f) any suitable paytable including any suitable quantity of winning symbol combinations may be employed; (g) any suitable combination of the symbols may be used as a winning symbol combination; (h) the winning symbol combinations may be associated with any suitable credit payouts; (i) any suitable quantity of paytables may be utilized; and (j) any suitable symbols may be employed and may include, for example, any suitable markings or indicia such as letters, numbers, or illustrations or pictures of objects.

Display device 120 displays an indication, notification, or message display area 121, which displays information, notifications, and/or messages before, during, or after play of the primary game; a credit meter 124, which displays the player's credit balance; a wager indicator or display 126, which displays any wager placed by the player for a play of the primary game; and an award indicator or display 128, which displays any award a player has won during a play of the primary game.

Figure 3A:
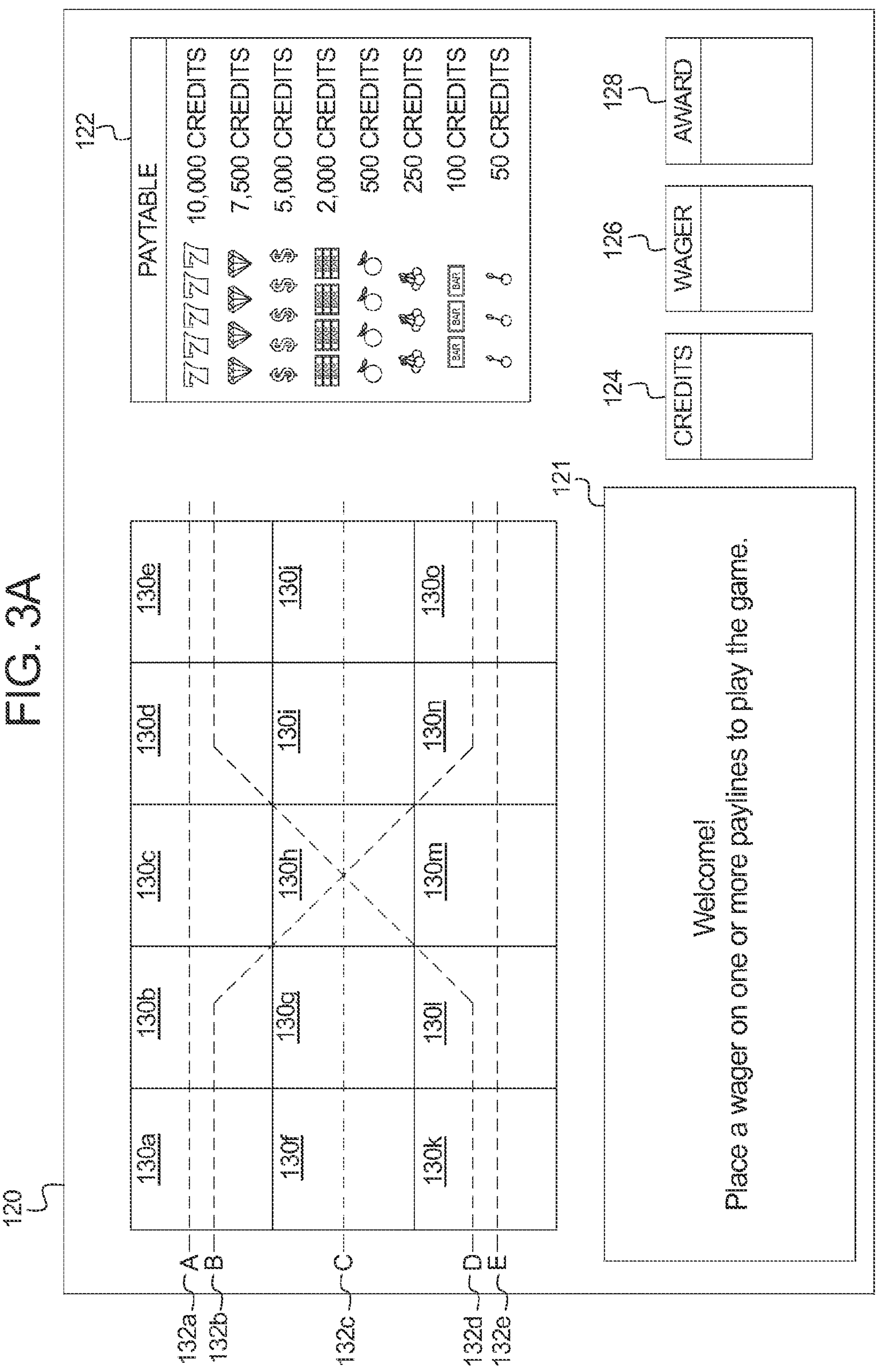
FIGS. 3A, 3B, 3C, 3D, 3E, 3F, 3G, and 3H are front views of a display device of one embodiment of the gaming system of the present disclosure, and illustrate example plays of an embodiment of the primary game including a cascading symbols feature causing one or more repositioned symbols to be wild symbols.

As illustrated in FIG. 3A, in this embodiment, when the gaming system is not being played, message display area 121 displays a message that invites a player to place a wager on one or more of the paylines for a play of the primary game.

Figure 3B:
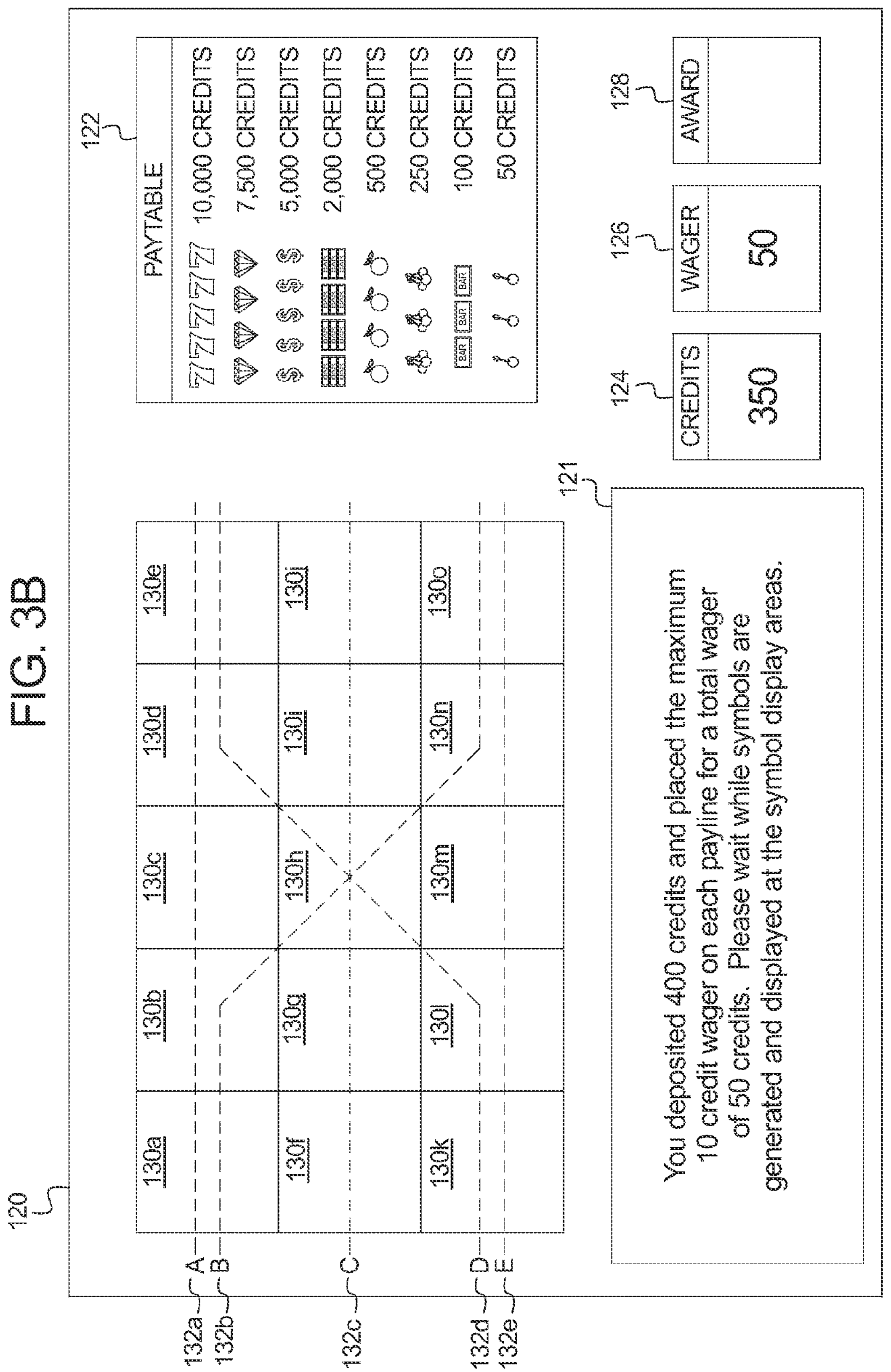

As illustrated in FIG. 3B, a player deposited currency and the gaming system provided the player with 400 credits. The player placed the maximum wager of 50 credits, which activated each of paylines A, B, C, D, and E and initiated a play of the primary game. The player's wager of 50 credits is displayed by wager indicator 126. The player's total remaining credit balance of 350 credits (i.e., the player's initial credit balance of 400 credits minus the player's wager of 50 credits) is displayed by credit meter 124.

Figure 3C:
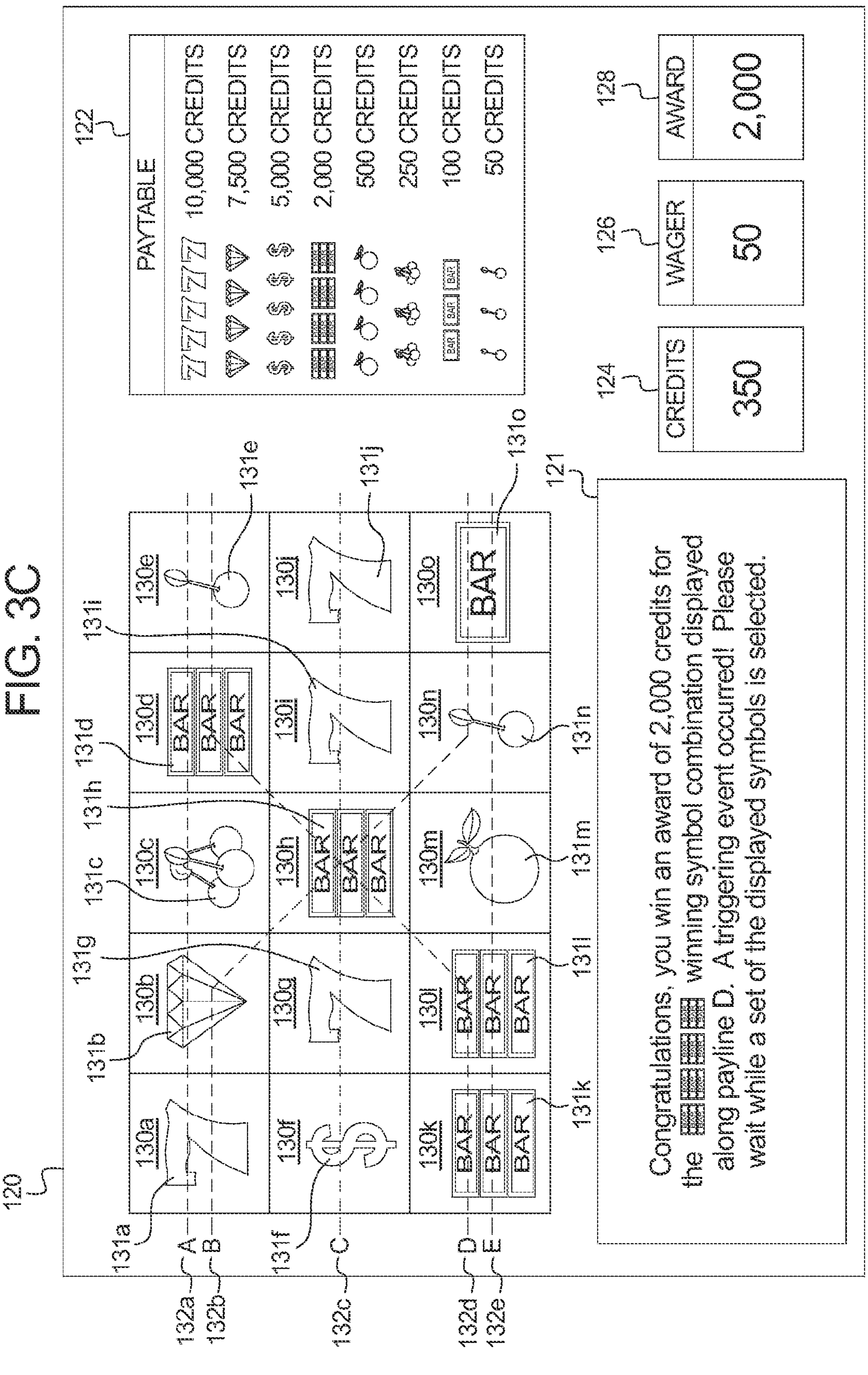

As illustrated in FIG. 3C, the gaming system generated and displayed one of the symbols at each of the symbol display areas for the wagered-on play of the primary game. Specifically, the gaming system generated and displayed: SEVEN symbol 131*a* at symbol display area 130*a*, DIAMOND symbol 131*b* at symbol display area 130*b*, TRIPLE CHERRY symbol 131*c* at symbol display area 130*c*, TRIPLE BAR symbol 131*d* at symbol display area 130*d*, CHERRY symbol 131*e* at symbol display area 130*e*, DOLLAR SIGN symbol 131*f* at symbol display area 130*f*, SEVEN symbol 131*g* at symbol display area 130G, TRIPLE BAR symbol 131*h* at symbol display area 130*h*, SEVEN symbol 131*i* at symbol display area 130*i*, SEVEN symbol 131*j* at symbol display area 130*j*, TRIPLE BAR symbol 131*k* at symbol display area 130*k*, TRIPLE BAR symbol 131*l* at symbol display area 130*l*, ORANGE symbol 131*m* at symbol display area 130*m*, CHERRY symbol 131*n* at symbol display area 130*n*, and BAR symbol 131*o* at symbol display area 130*o*.

After generating and displaying one of the symbols at each of the symbol display areas, the gaming system makes an award determination based on the displayed symbols. That is, the gaming system determines whether the displayed symbols form any of the winning symbol combinations included in paytable 122 along wagered-on paylines A, B, C, D, and/or E. As indicated by the message displayed in message display area 121, in this example the player wins 2,000 credits for the TRIPLE BAR-TRIPLE BAR-TRIPLE BAR-TRIPLE BAR winning symbol combination formed by TRIPLE BAR symbol 131*k*, TRIPLE BAR symbol 131*l*, TRIPLE BAR symbol 131*h*, and TRIPLE BAR symbol 131*d* displayed from left to right along payline D. Accordingly, the player's 2,000 credit award is displayed by award indicator 128.

The gaming system determines whether the triggering event has occurred. In various embodiments, the triggering event occurs: (a) before the gaming system generates and displays the symbols, (b) while the gaming system generates and displays the symbols (i.e., during symbol generation), (c) after the gaming system generates and displays the symbols, and (d) at any suitable time. It should thus be appreciated that, in various embodiments, the gaming system determines whether the triggering event has occurred: (a) before the gaming system generates and displays the symbols, or (b) while the gaming system is generating and displaying the symbols (i.e., during symbol generation), (c) after the gaming system generates and displays the symbols, and (d) at any suitable time.

The triggering event may be any suitable event. For example, in various embodiments, the triggering event is: (a) a randomly determined event, (b) a predetermined event, (c) an event based on the generated symbols or a combination or combinations of the generated symbols, (d) an event based on the player's status (such as through a player tracking system), (e) an event based on a random determination made by the gaming system of a central controller, (f) an event based on one or more side wagers placed by the player, (g) an event based on the player's primary game wager, (h) an event based on time (such as time of day), (i) an event based on an amount of coin-in accumulated in one or more pools, and (j) an event based on a weighted probability table, (k) an event not based on the generated symbols or a combination or combinations of the generated symbols, (l) an event independent of game play, and (m) any suitable combination thereof.

In this example, as indicated by the message displayed in message display area 121 shown in FIG. 3C, the gaming system determined that the triggering event occurred. If the triggering event occurs in this embodiment, the gaming system determines a set of at least one of the displayed symbols. Accordingly, the message displayed in message display area 121 shown in FIG. 3C instructs the player to wait while the gaming system determines a set of the displayed symbols. In this example, the gaming system randomly determines which of the displayed symbols to include in the set of the displayed symbols.

It should be appreciated that, in certain other embodiments, the symbols included in the set of symbols are: (a) predetermined, (b) determined based on the generated symbols or a combination or combinations of the generated symbols, (c) determined based on the player's status (such as through a player tracking system), (d) determined based on a random determination made by a central controller, (e) determined based on one or more side wagers placed by the player, (f) determined based on the player's primary game wager, (g) determined based on time (such as time of day), (h) determined based on an amount of coin-in accumulated in one or more pools, (i) determined based on a weighted probability table, (j) not determined based on the generated symbols or a combination or combinations of the generated symbols, (k) not determined based on game play, and (l) any suitable combination thereof.

It should also be appreciated that, in certain other embodiments, the gaming system determines a set of the symbol display areas rather than a set of the displayed symbols. In these embodiments, the gaming system removes any symbols displayed in the symbol display area or areas of the determined set of the symbol display areas.

Figure 3D:
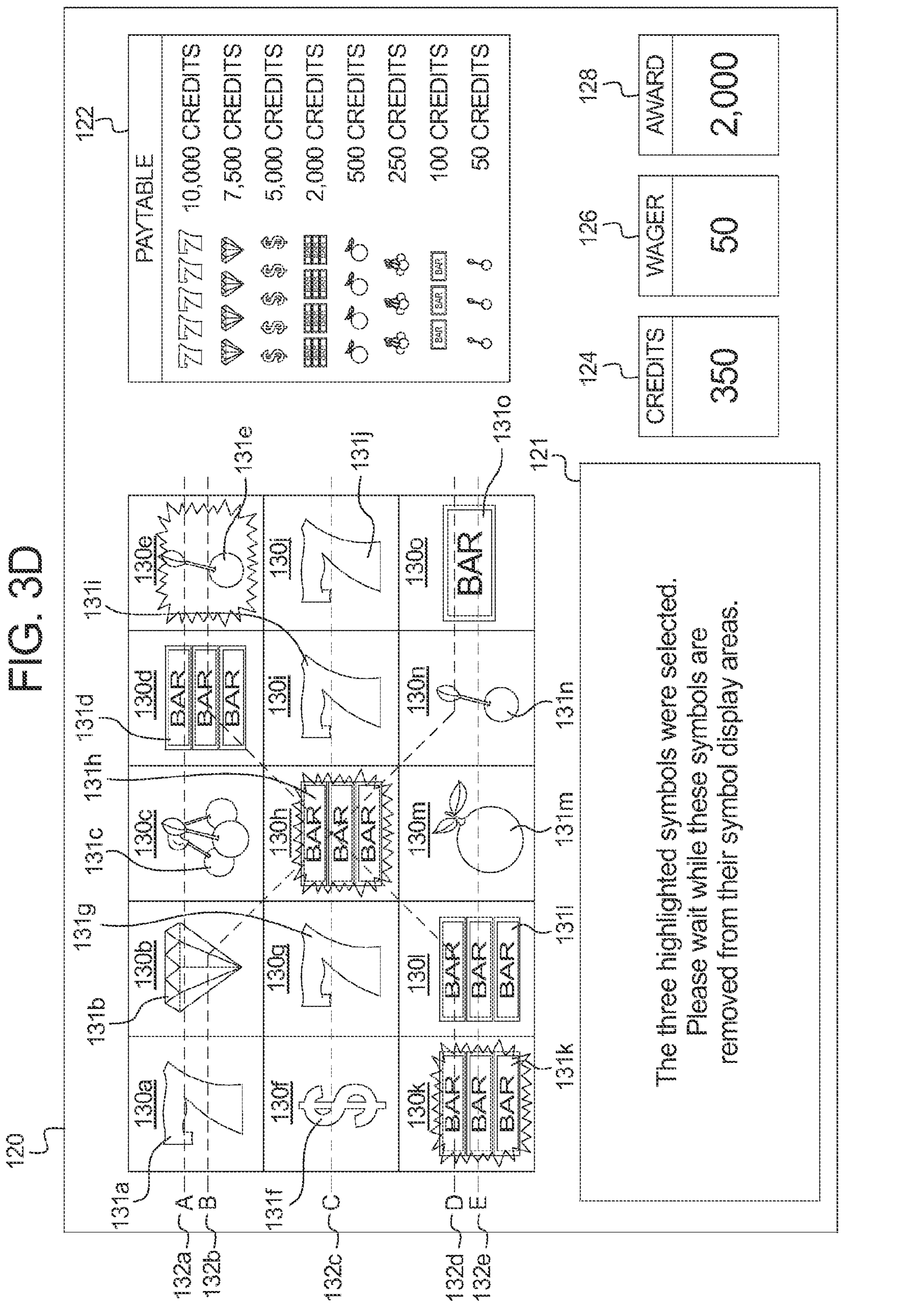

As indicated by the message displayed in message display area 121 shown in FIG. 3D, in this example the gaming system randomly determined to include the following displayed symbols in the set of the displayed symbols: TRIPLE BAR symbol 131*k*, TRIPLE BAR symbol 131*h*, and CHERRY symbol 131*e*. In this embodiment, after determining the set of the displayed symbols, for each of the displayed symbols of the set of the displayed symbols, the gaming system removes that displayed symbol from the symbol display area at which that displayed symbol is displayed. Accordingly, the message displayed in message display area 121 shown in FIG. 3D instructs the player to wait while the displayed symbols of the set of the displayed symbols are removed from their respective symbol display areas.

Figure 3E:
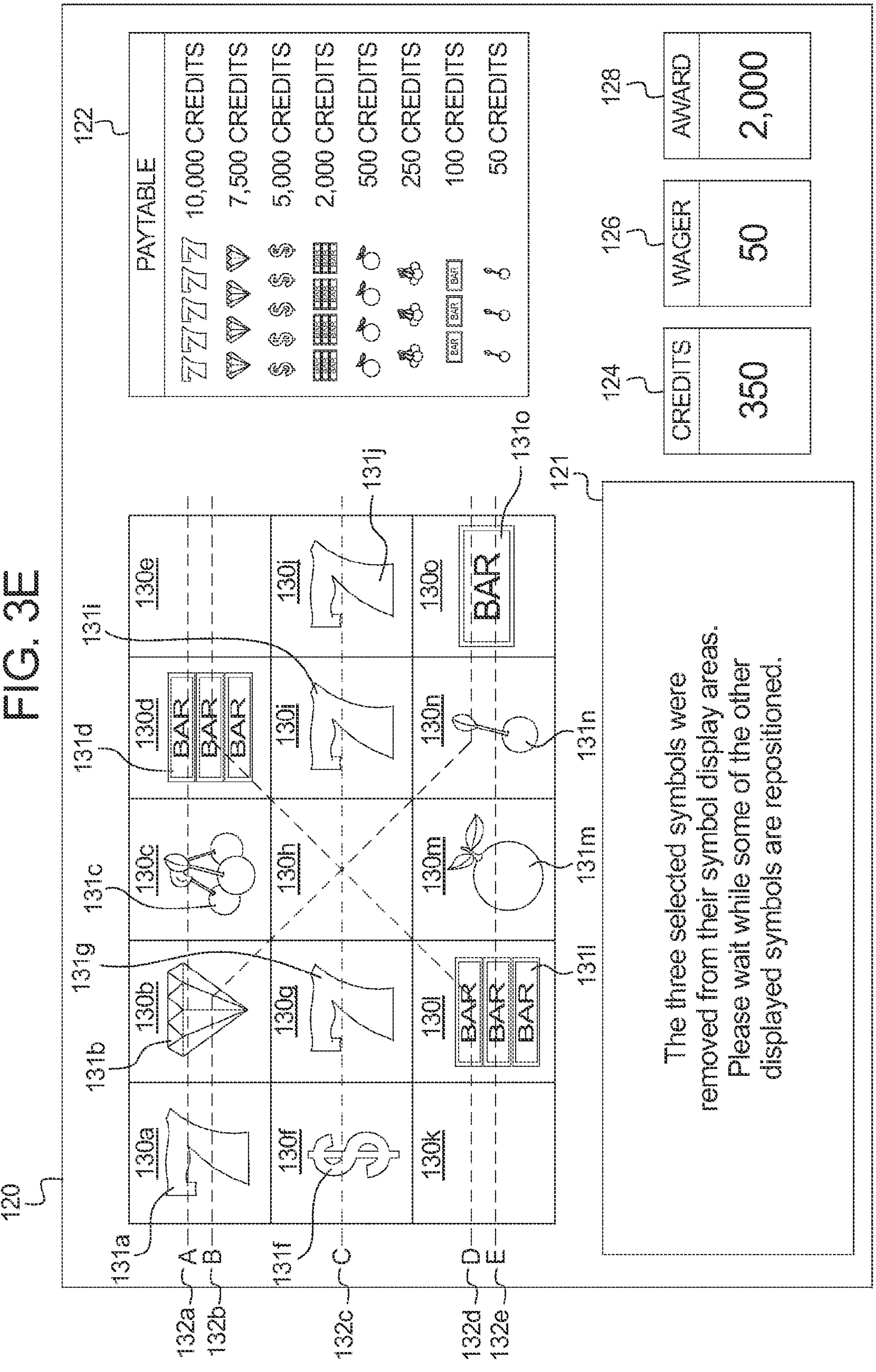

As illustrated in FIG. 3E, the gaming system removed: (a) TRIPLE BAR symbol 131*k* from symbol display area 130*k* (now referred to as removed TRIPLE BAR symbol 131*k*), (*b*) TRIPLE BAR symbol 131*h* from symbol display area 130*h* (now referred to as removed TRIPLE BAR symbol 131*k*), and (c) CHERRY symbol 131*e* from symbol display area 130*e* (now referred to as removed CHERRY symbol 131*e*). The removal of these displayed symbols results in symbol display area 130*k*, symbol display area 130*h*, and symbol display area 130*e* being empty (i.e., not displaying any of the symbols). After removal of the displayed symbols of the set of the displayed symbols from their respective symbol display areas, in this embodiment, for each of the empty symbol display areas, the gaming system repositions zero, one, or a plurality of the displayed symbols such that zero, one, or a plurality of second empty symbol display areas are created. Any displayed symbols that are repositioned are referred to as repositioned symbols, and any displayed symbols that are removed are referred to as removed symbols.

More specifically, in this embodiment, for each of the empty symbol display areas, the gaming system repositions any symbols displayed at symbol display areas that are: (a) located in the same column as that empty symbol display area, and (b) positioned above that empty symbol display area by shifting each of those displayed symbols downward such that one of those displayed symbols is displayed at that empty symbol display area (i.e., fills that empty symbol display area). The repositioning of one or more of the displayed symbols creates one or more second empty symbol display areas. That is, each repositioned symbol vacates the symbol display area at which it was initially displayed such that one or more of the repositioned symbols fills one or more of the empty symbol display areas. Thus, at least one of the symbol display areas vacated by the repositioned symbols remains empty after repositioning of the symbols (i.e., at least one second empty symbol display area is created). Accordingly, the message displayed in message display area 121 shown in FIG. 3E instructs the player to wait while the gaming system repositions zero, one, or a plurality of the displayed symbols.

It should thus be appreciated that, in this embodiment: (a) if a symbol display area at the top of one of the columns of symbol display areas (symbol display areas 130*a*, 130*b*, 130*c*, 130*d*, and 130*e* in this illustrated example) is empty, the gaming system repositions zero of the displayed symbols to fill that empty symbol display area; (b) if a symbol display area in the middle of one of the columns of symbol display areas (symbol display areas 130*f*, 130*g*, 130*h*, 130*i*, and 130*j* in this illustrated example) is empty, the gaming system repositions one of the displayed symbols (i.e., the symbol displayed in the above-positioned symbol display area) downward to fill that empty symbol display area; and (c) if a symbol display area in the bottom of one of the columns of symbol display areas (symbol display areas 130*k*, 130*l*, 130*m*, 130*n*, and 130*o* in this illustrated example) is empty, the gaming system repositions two of the displayed symbols (i.e., the symbol displayed in the above-positioned symbol display areas) downward to fill that empty symbol display area.

In certain other embodiments, for a designated one of, a designated plurality of, or each of any empty symbol display areas, the gaming system repositions one or more of the displayed symbols such that one of the repositioned symbols is displayed at that empty symbol display area (i.e., fills that empty symbol display area), thereby creating at least one second empty symbol display area. In some embodiments, for a designated one of or a designated plurality of any empty symbol display areas, the gaming system does not reposition one or more of the displayed symbols such that one of the repositioned symbols is displayed at that empty symbol display area (i.e., fills that empty symbol display area). That is, in these embodiments, certain of the symbol display areas are not configured to receive repositioned displayed symbols while certain of the other symbol display areas are configured to receive repositioned displayed symbols.

In certain other embodiments, the gaming system determines whether to reposition any of the displayed symbols and, if the gaming system determines not to do so, does not reposition any of the displayed symbols.

In various embodiments, the displayed symbols are repositioned in any suitable manner, such as: (a) by shifting the symbols upwards, (b) by shifting the symbols sideways, (c) by shifting the symbols downwards, (d) by shifting the symbols diagonally, (e) any combination thereof, and (f) by moving the symbols in any other suitable manner.

Figure 3F:
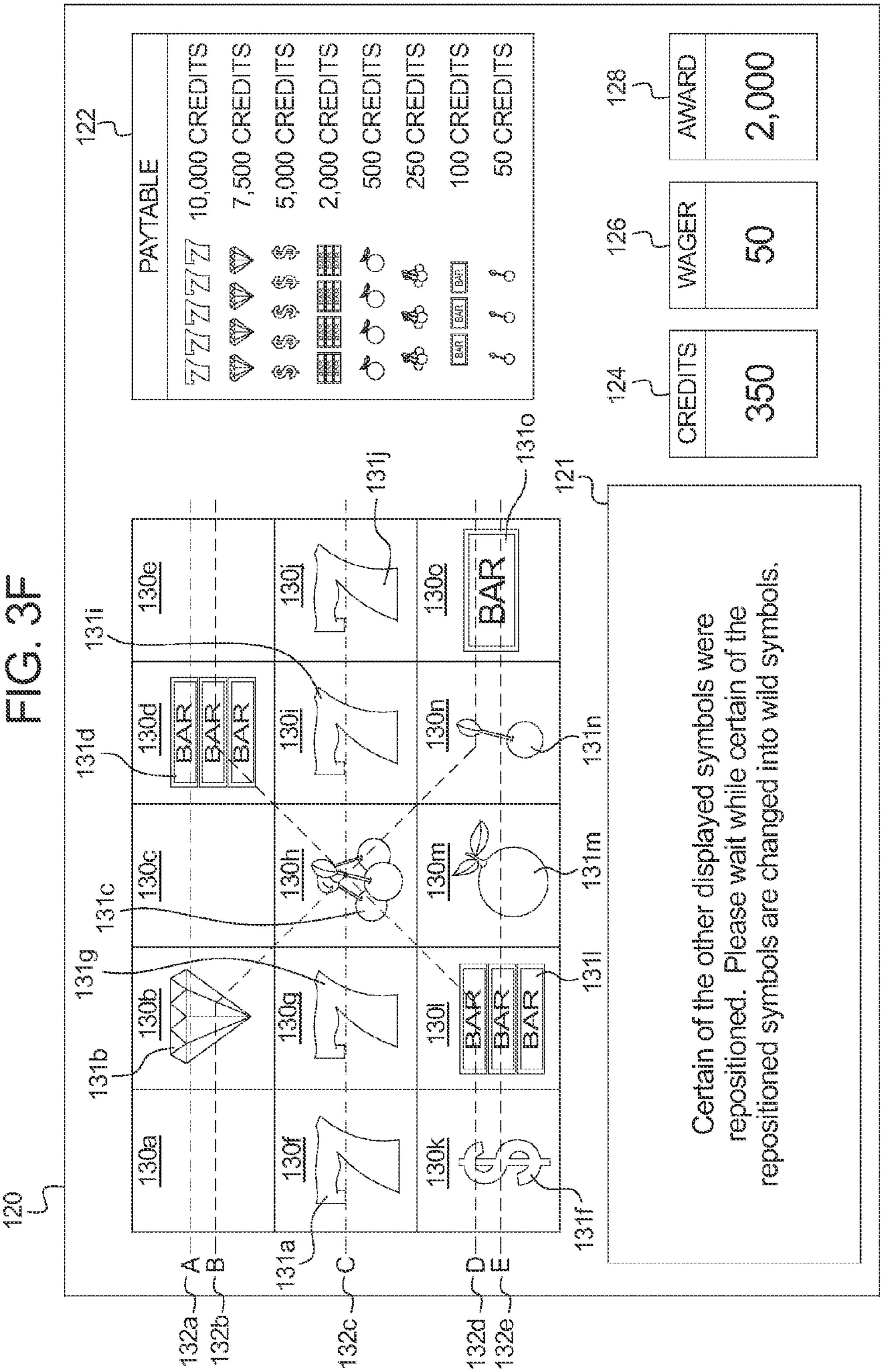

As illustrated in FIG. 3F, the gaming system repositioned DOLLAR SIGN symbol 131*f* downward such that it is displayed at (i.e., fills) empty symbol display area 130*k*, and repositioned SEVEN symbol 131*a* downward such that it (i.e., fills) symbol display area 130*f*. These repositioned symbols are referred to as repositioned DOLLAR SIGN symbol 131*f* and repositioned SEVEN symbol 131*a*. The repositioning of these symbols results in symbol display area 130*a* being empty (i.e., being a second empty symbol display area). Similarly, the gaming system repositioned TRIPLE CHERRY symbol 131*c* downward such that it is displayed at (i.e., fills) empty symbol display area 130*h*. This repositioned symbol is referred to as repositioned TRIPLE CHERRY symbol 131*c*. The repositioning of this symbol results in symbol display area 130*c* being empty (i.e., being a second empty symbol display area). Since empty symbol display area 130*e* is located at the top of the column of symbol display areas of which it is a part (i.e., since no symbol display areas displaying any symbols are located above empty symbol display area 130*e*), in this example none of the displayed symbols are repositioned to fill empty symbol display area 130*e*.

After repositioning any of the displayed symbols, the gaming system causes certain of the repositioned symbols to be wild symbols. Specifically, in this embodiment, the gaming system causes any repositioned symbols that are displayed at a symbol display area at which a removed symbol was previously displayed to be wild symbols. In this embodiment, the gaming system causes one or more of the repositioned symbols to be wild symbols by changing those symbols into a wild symbol. It should be appreciated that the gaming system may cause one or more of the repositioned symbols to be wild symbols in any suitable manner, such as by treating those repositioned symbols as if they are wild symbols without changing them into a wild symbol.

Figure 3G:
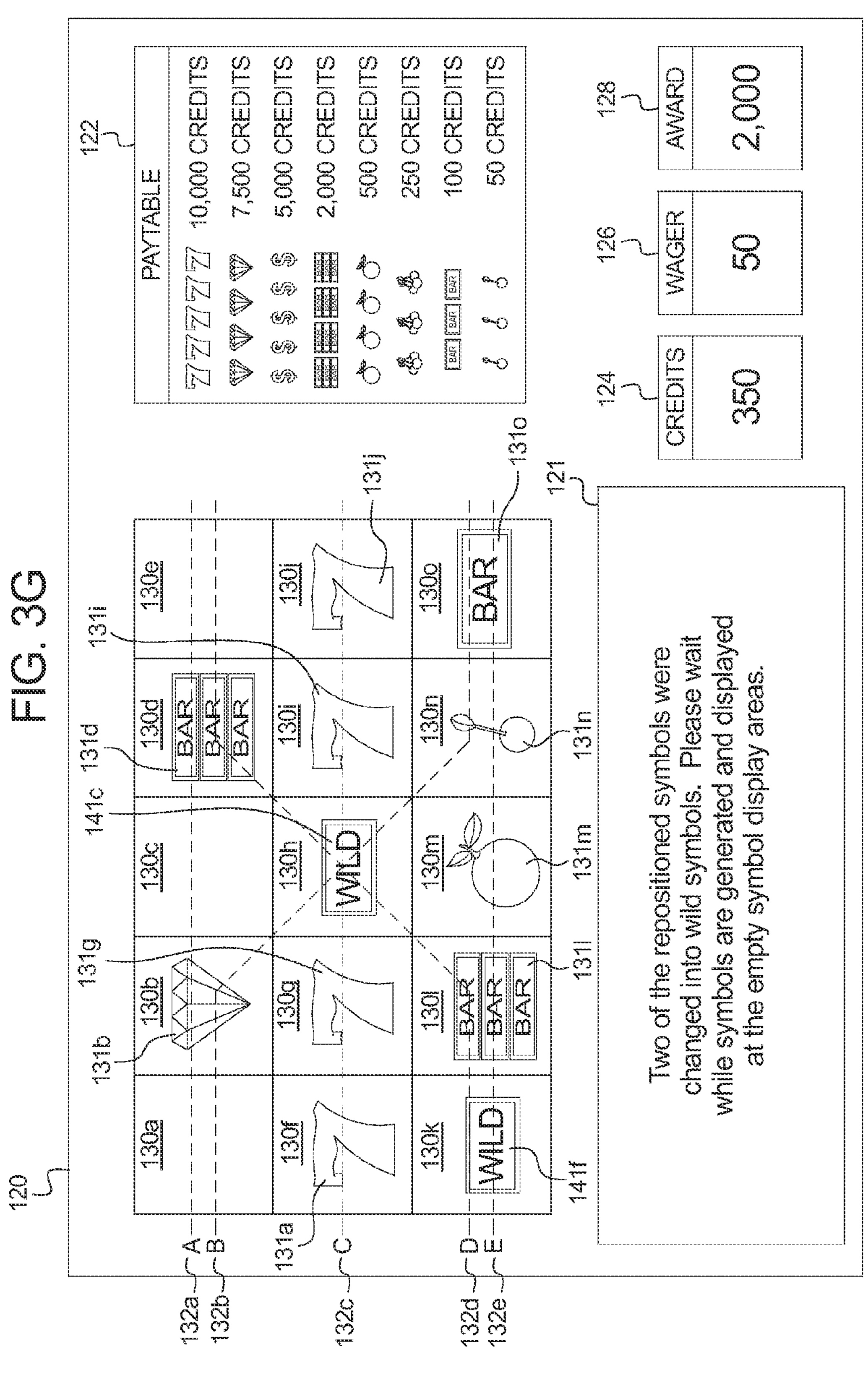

As illustrated in FIG. 3G, since repositioned DOLLAR SIGN symbol 131*f* is displayed at symbol display area 130*k*, which previously displayed removed TRIPLE BAR symbol 131*k*, the gaming system changes repositioned DOLLAR SIGN symbol 131*f* into WILD symbol 141*f*. Similarly, since repositioned TRIPLE CHERRY symbol 131*c* is displayed at symbol display area 130*h*, which previously displayed removed TRIPLE BAR symbol 131*h*, the gaming system changes repositioned TRIPLE CHERRY symbol 131*c* into WILD symbol 141*c*. In this example, the gaming system does not change repositioned SEVEN symbol 131*a* into a wild symbol because repositioned SEVEN symbol 131*a* is not displayed at a symbol display area at which a removed symbol was displayed. Rather, repositioned SEVEN symbol 131*a* is displayed at a symbol display area at which a repositioned symbol (specifically, repositioned DOLLAR SIGN symbol 131*f*) was previously displayed. It should be appreciated, however, that in certain other embodiments the gaming system causes one, each, or a plurality of any repositioned symbols to be a wild symbol regardless of whether those repositioned symbols are displayed at symbol display areas at which removed symbols were previously displayed. In various other embodiments, the gaming system randomly determines one or a plurality of any repositioned symbols to be a wild symbol regardless of whether those repositioned symbols are displayed at symbol display areas at which removed symbols were previously displayed.

Figure 3H:
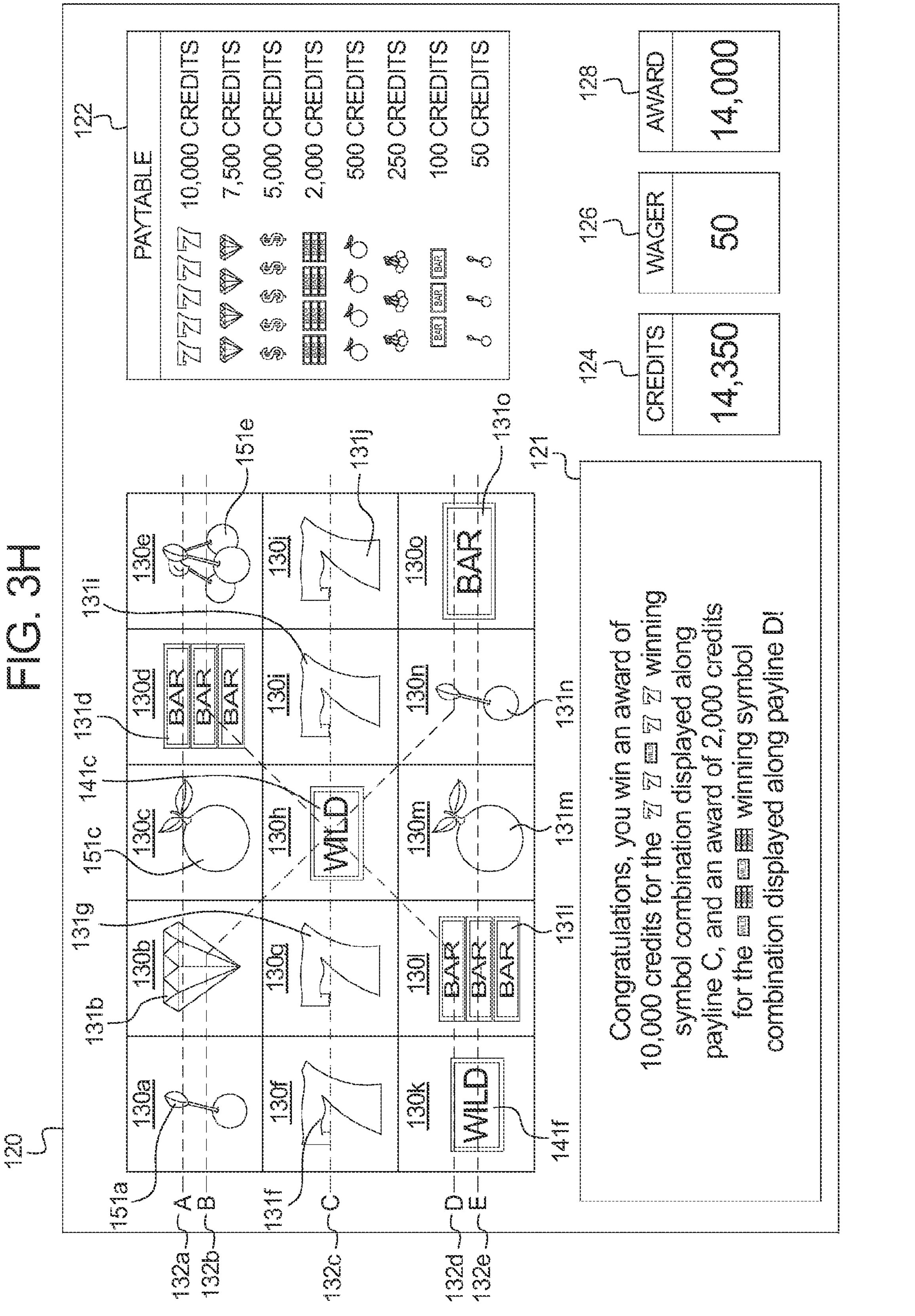

After changing one or more of the repositioned symbols into wild symbols, the gaming system generates and displays one of the symbols at each of any remaining empty symbol display areas. That is, the gaming system generates and displays one of the symbols at each of: (a) any empty symbol display areas at which a removed symbol was previously displayed, and (b) any second empty symbol display areas at which a repositioned symbol was previously displayed. As illustrated in FIG. 3H, the gaming system generated and displayed: CHERRY symbol 151*a* at second empty symbol display area 130*a* (at which repositioned SEVEN symbol 131*a* was previously displayed), ORANGE symbol 151*c* at second empty symbol display area 130*c* (at which repositioned TRIPLE CHERRY symbol 131*c*, which the gaming system changed into WILD symbol 141*c*, was previously displayed), and TRIPLE CHERRY symbol 151*e* at empty symbol display area 130*e* (at which removed CHERRY symbol 131*e* was previously displayed).

After generating and displaying one of the symbols at each of any empty symbol display areas and any second empty symbol display areas, the gaming system makes an additional award determination. That is, the gaming system determines whether the displayed symbols form any of the winning symbol combinations included in paytable 122 along wagered-on paylines A, B, C, D, and/or E. As indicated by the message displayed in message display area 121: (a) the player wins 10,000 credits for the SEVEN-SEVEN-WILD-SEVEN-SEVEN winning symbol combination (which is considered to be a SEVEN-SEVEN-SEVEN-SEVEN-SEVEN winning symbol combination by virtue of the wild symbol) formed by repositioned SEVEN symbol 131*a*, SEVEN symbol 131*g*, WILD symbol 141*c*, SEVEN symbol 131*i*, and SEVEN symbol 131*j* displayed from left to right along payline C; and (b) the player wins 2,000 credits for the WILD-TRIPLE BAR-WILD-TRIPLE BAR winning symbol combination (which is considered to be an TRIPLE BAR-TRIPLE BAR-TRIPLE BAR-TRIPLE BAR winning symbol combination by virtue of the wild symbols) formed by WILD symbol 141*f*, TRIPLE BAR symbol 131*l*, WILD symbol 141*c*, and TRIPLE BAR symbol 131*d* displayed from left to right along payline D. Accordingly, the 12,000 credit additional award is added to the player's previous award of 2,000 credits and displayed as a total 14,000 credit award by award indicator 128. The player's credit balance, which is displayed by credit meter 124, is increased to 14,350 credits to reflect the player's previous credit balance of 350 credits plus the player's total award of 14,000 credits. In this embodiment, the play of the primary game is complete following the additional award determination.

In various other embodiments, after making the additional award determination, the gaming system again determines whether the triggering event has occurred. If the triggering event occurred again, the gaming system repeats the above-described process. This continues until the gaming system determines that the triggering event has not occurred.

In certain embodiments, the gaming system causes one or more repositioned symbols to be one of a plurality of different wild multiplier symbols based on a quantity of symbol display areas the repositioned symbols move. In one example, if a repositioned symbol moves one symbol display area, such as one symbol display area upward, downward, or sideways, the gaming system causes that repositioned symbol to be a 1× WILD symbol. In this example, if a repositioned symbol moves two symbol display areas, such as two symbol display areas downward, two symbol display areas downward, two symbol display areas sideways, one symbol display area upward and one symbol display area sideways, or one symbol display area downward and one symbol display area sideways, the gaming system causes that repositioned symbol to be a 2× WILD symbol. It should thus be appreciated that, in these embodiments, a player has a relatively greater chance of winning higher awards if more symbols are removed (i.e., if more symbols are included in the set of the displayed symbols determined by the gaming system) because more empty symbol display areas leads to a greater probability that a displayed symbol will move multiple symbol display areas.

In various other embodiments, the gaming system indicates which of the displayed symbols will be removed if the triggering event occurs. For example, in one of these embodiments, prior to the occurrence of the triggering event, the gaming system displays an indication that certain of the displayed symbols will be removed and that certain of the displayed symbols will be repositioned if the triggering event occurs. In this example embodiment, the gaming system displays may certain of the displayed symbols as stone symbols that, if the triggering event occurs, crush any symbols below them, thereby removing the crushed symbols and repositioning the stone symbols.

It should be appreciated that the above-described cascading symbols feature may be employed in conjunction with a wagering game that is not otherwise a cascading symbols wagering game. That is, the above-described cascading symbols feature may be used to introduce a cascading symbols feature to an existing wagering game that does not include any other cascading symbols feature.

Figure 4:
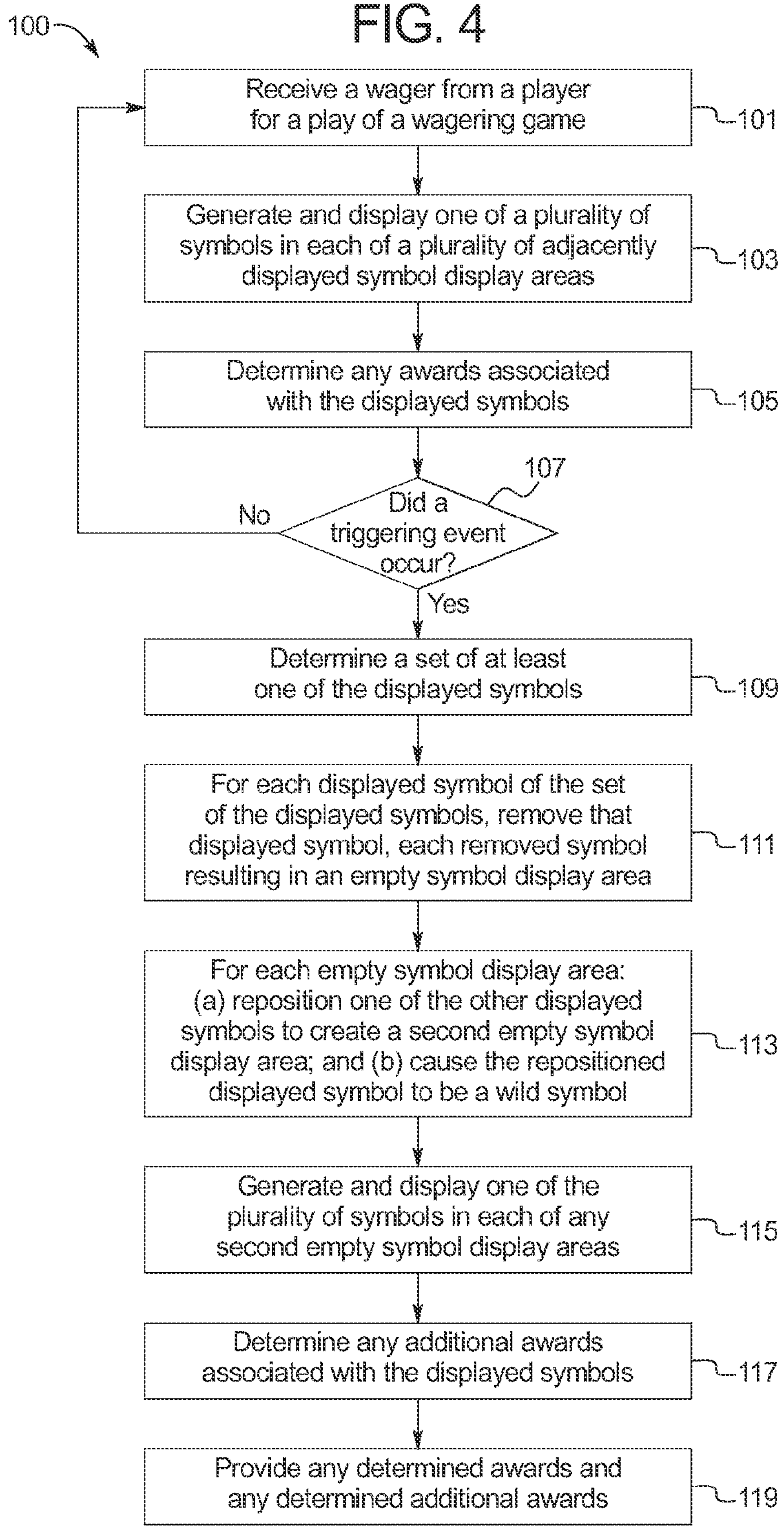
FIG. 4 is a flowchart illustrating an example method of operating a one embodiment of the gaming system of the present disclosure.

FIG. 4 illustrates a flowchart of an example of a process or method 100 for operating a gaming system of the present disclosure. In one embodiment, this process 100 is represented by a set of instructions stored in one or more memories and executed by one or more processors or controllers. Although this process 100 is described with reference to the flowchart shown in FIG. 4, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system receives a wager from a player for a play of a wagering game, as indicated by block 101. The wagering game includes a plurality of adjacently displayed symbol display areas, each of which is configured to display one of a plurality of symbols. The gaming system generates and displays one of the symbols in each of the symbol display areas, as indicated by block 103. The gaming system determines any awards associated with the displayed symbols, as indicated by block 105. Specifically, the gaming system determines whether any of the displayed symbols form any of a plurality of winning symbol combinations, and determines any awards associated with any displayed winning symbol combinations. The gaming system determines whether a triggering event occurred, as indicated by diamond 107. If the triggering event did not occur, process 100 returns to block 101. It should be appreciated that, in other embodiments, the gaming system does not determine any awards until after the triggering event has occurred.

If the triggering event occurred, the gaming system determines a set of at least one of the displayed symbols, as indicated by block 109. For each displayed symbol of the set of the displayed symbols, the gaming system removes that symbol, each removed symbol resulting in an empty symbol display area, as indicated by block 111. For each empty symbol display area, the gaming system: (a) repositions one of the other displayed symbols to create a second empty symbol display area, and (b) causes the repositioned symbol to be a wild symbol, as indicated by block 113. The gaming system generates and displays one of the plurality of symbols in each of any second empty symbol display areas, as indicated by block 115. The gaming system determines any additional awards associated with the displayed symbols, as indicated by block 117. Specifically, the gaming system determines whether any of the displayed symbols form any of a plurality of winning symbol combinations, and determines any additional awards associated with any displayed winning symbol combinations. The gaming system provides any determined awards and any determined additional awards, as indicated by block 119.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
- at least one display device;
- at least one input device;
- at least one processor; and
- at least one memory device storing a plurality of instructions which, when executed by the at least one processor, cause the at least one processor to operate with the at least one display device and the at least one input device, for a play of a game, to:
- (a) generate and display one of a plurality of symbols in each of a plurality of adjacently displayed symbol display areas;
- (b) determine any awards associated with the displayed symbols;
- (c) if a triggering event occurs:
  - (i) determine a set of at least one of the displayed symbols;
  - (ii) for each displayed symbol of the set of the displayed symbols, remove said displayed symbol, each removed symbol resulting in an empty symbol display area;
  - (iii) for each empty symbol display area:
    - (A) reposition one of the other displayed symbols to create a second empty symbol display area; and
    - (B) cause said repositioned symbol to be a wild symbol;
  - (v) generate and display one of the plurality of symbols in each of any second empty symbol display areas; and
  - (vi) determine any additional awards associated with the displayed symbols; and
- (d) provide any determined awards and any determined additional awards.

2. The gaming system of claim 1, wherein the triggering event randomly occurs.

3. The gaming system of claim 1, wherein the plurality of instructions, when executed by the at least one processor, cause the at least one processor to randomly determine which of the displayed symbols to include in the set of the displayed symbols.

4. The gaming system of claim 1, wherein the set of the displayed symbols includes a plurality of the displayed symbols.

5. The gaming system of claim 1, wherein the plurality of instructions, when executed by the at least one processor, cause the at least one processor to, for each empty symbol display area, reposition one of the other displayed symbols by at least one of: shifting said displayed symbol downward, shifting said displayed symbol upward, shifting said displayed symbol to the left, and shifting said displayed symbol to the right.

6. The gaming system of claim 1, wherein the plurality of instructions, when executed by the at least one processor, cause the at least one processor to, for each repositioned symbol, cause said repositioned symbol to be a wild symbol by replacing said repositioned symbol with a wild symbol.

7. The gaming system of claim 1, wherein the plurality of instructions, when executed by the at least one processor, cause the at least one processor to, for at least one repositioned symbol, associate a multiplier with said repositioned symbol.

8. The gaming system of claim 7, wherein a value of said multiplier is based on a quantity of symbol display areas said at least one repositioned symbol moved.

9. The gaming system of claim 1, wherein the plurality of instructions, when executed by the at least one processor, cause the at least one processor to operate with the at least on display device to, prior to the occurrence of the triggering event, display an indication of which of the displayed symbols would be removed should the triggering event occur.

10. A method of operating a gaming system, said method comprising, for a play of a game:
- (a) causing at least one processor to execute a plurality of instructions stored in at least one memory device to operate with at least one display device to generate and display one of a plurality of symbols in each of a plurality of adjacently displayed symbol display areas;
- (b) causing the at least one processor to execute the plurality of instructions to determine any awards associated with the displayed symbols;
- (c) if a triggering event occurs:
  - (i) causing the at least one processor to execute the plurality of instructions to determine a set of at least one of the displayed symbols;
  - (ii) for each displayed symbol of the set of the displayed symbols, causing the at least one processor to execute the plurality of instructions to remove said displayed symbol, each removed symbol resulting in an empty symbol display area;
  - (iii) for each empty symbol display area:
    - (A) causing the at least one processor to execute the plurality of instructions to reposition one of the other displayed symbols to create a second empty symbol display area; and
    - (B) causing the at least one processor to execute the plurality of instructions to cause said repositioned symbol to be a wild symbol;
  - (v) causing the at least one processor to execute the plurality of instructions to operate with the at least one display device to generate and display one of the plurality of symbols in each of any second empty symbol display areas; and
  - (vi) causing the at least one processor to execute the plurality of instructions to determine any additional awards associated with the displayed symbols; and
- (d) causing the at least one processor to execute the plurality of instructions to cause any determined awards and any determined additional awards to be provided.

11. The method of claim 10, wherein the triggering event randomly occurs.

12. The method of claim 10, which includes causing the at least one processor to execute the plurality of instructions to randomly determine which of the displayed symbols to include in the set of the displayed symbols.

13. The method of claim 10, wherein the set of the displayed symbols includes a plurality of the displayed symbols.

14. The method of claim 10, which includes causing the at least one processor to execute the plurality of instructions to, for each empty symbol display area, reposition one of the other displayed symbols by at least one of: shifting said displayed symbol downward, shifting said displayed symbol upward, shifting said displayed symbol to the left, and shifting said displayed symbol to the right.

15. The method of claim 10, which includes causing the at least one processor to execute the plurality of instructions to, for each repositioned symbol, cause said repositioned symbol to be a wild symbol by replacing said repositioned symbol with a wild symbol.

16. The method of claim 10, which includes causing the at least one processor to execute the plurality of instructions to, for at least one repositioned symbol, associate a multiplier with said repositioned symbol.

17. The method of claim 16, wherein a value of said multiplier is based on a quantity of symbol display areas said at least one repositioned symbol moved.

18. The method of claim 10, which includes causing the at least one processor to execute the plurality of instructions to operate with the at least on display device to, prior to the occurrence of the triggering event, display an indication of which of the displayed symbols would be removed should the triggering event occur.

19. The method of claim 10, which is provided through a data network.

20. The method of claim 19, wherein the data network is an internet.

21. A non-transitory computer readable medium including a plurality of instructions which, when executed by at least one processor, cause the at least one processor to:

(a) generate and cause at least one display device to display one of a plurality of symbols in each of a plurality of adjacently displayed symbol display areas;

(b) determine any awards associated with the displayed symbols;

(c) if a triggering event occurs:

(i) determine a set of at least one of the displayed symbols;

(ii) for each displayed symbol of the set of the displayed symbols, remove said displayed symbol, each removed symbol resulting in an empty symbol display area;

(iii) for each empty symbol display area:

(A) reposition one of the other displayed symbols to create a second empty symbol display area; and (B) cause said repositioned symbol to be a wild symbol;

(v) generate and cause the at least one display device to display one of the plurality of symbols in each of any second empty symbol display areas; and (vi) determine any additional awards associated with the displayed symbols; and (d) provide any determined awards and any determined additional awards.

22. The non-transitory computer readable medium of claim 21, wherein the triggering event randomly occurs.

23. The non-transitory computer readable medium of claim 21, wherein the plurality of instructions, when executed by the at least one processor, cause the at least one processor to randomly determine which of the displayed symbols to include in the set of the displayed symbols.

24. The non-transitory computer readable medium of claim 21, wherein the set of the displayed symbols includes a plurality of the displayed symbols.

25. The non-transitory computer readable medium of claim 21, wherein the plurality of instructions, when executed by the at least one processor, cause the at least one processor to, for each empty symbol display area, reposition one of the other displayed symbols by at least one of: shifting said displayed symbol downward, shifting said displayed symbol upward, shifting said displayed symbol to the left, and shifting said displayed symbol to the right.

26. The non-transitory computer readable medium of claim 21, wherein the plurality of instructions, when executed by the at least one processor, cause the at least one processor to, for each repositioned symbol, cause said repositioned symbol to be a wild symbol by replacing said repositioned symbol with a wild symbol.

27. The non-transitory computer readable medium of claim 21, wherein the plurality of instructions, when executed by the at least one processor, cause the at least one processor to, for at least one repositioned symbol, associate a multiplier with said repositioned symbol.

28. The non-transitory computer readable medium of claim 27, wherein a value of said multiplier is based on a quantity of symbol display areas said at least one repositioned symbol moved.

29. The non-transitory computer readable medium of claim 21, wherein the plurality of instructions, when executed by the at least one processor, cause the at least one processor cause the at least on display device to, prior to the occurrence of the triggering event, display an indication of which of the displayed symbols would be removed should the triggering event occur.

* * * * *

UNITED STATES PATENT AND TRADEMARK OFFICE

CERTIFICATE OF CORRECTION

PATENT NO. : 8,608,545 B2
APPLICATION NO. : 13/312651
DATED : December 17, 2013
INVENTOR(S) : Prashant Arora et al.

It is certified that error appears in the above-identified patent and that said Letters Patent is hereby corrected as shown below:

IN THE CLAIMS

In Claim 1, Column 27, Line 32, between the second instance of "of" and the second instance of "the" insert --at least one of--.
In Claim 3, Column 27, Line 53, between the second instance of "of" and the second instance of "the" insert --at least one of--.
In Claim 4, Column 27, Line 55, between the second instance of "of" and the second instance of "the" insert --at least one of--.
In Claim 6, Column 28, Line 2, replace "a" with --the--.
In Claim 6, Column 28, Line 3, replace "a" with --the--.
In Claim 9, Column 28, Line 14, replace "on" with --one--.
In Claim 10, Column 28, Line 32, between the second instance of "of" and the second instance of "the" insert --at least one of--.
In Claim 12, Column 28, Line 61, between "of" and the second instance of "the" insert --at least one of--.
In Claim 13, Column 28, Line 62, between the second instance of "of" and the second instance of "the" insert --at least one of--.
In Claim 15, Column 29, Line 7, replace "a" with --the--.
In Claim 15, Column 29, Line 8, replace "a" with --the--.
In Claim 18, Column 29, Line 18, replace "on" with --one--.
In Claim 21, Column 29, Line 37, between the second instance of "of" and the second instance of "the" insert --at least one of--.
In Claim 23, Column 30, Line 12, between "of" and "the" insert --at least one of--.
In Claim 24, Column 30, Line 14, between "of" and the second instance of "the" insert --at least one of--.
In Claim 26, Column 30, Line 29, replace "a" with --the--.
In Claim 26, Column 30, Line 30, replace "a" with --the--.
In Claim 29, Column 30, Line 43, after the second instance of "processor" insert --to--.
In Claim 29, Column 30, Line 44, replace "on" with --one--.

Signed and Sealed this
Second Day of June, 2015

Michelle K. Lee

Michelle K. Lee
*Director of the United States Patent and Trademark Office*